US010165694B1

(12) United States Patent
Werner et al.

(10) Patent No.: US 10,165,694 B1
(45) Date of Patent: Dec. 25, 2018

(54) CONCEALED BAROMETRIC VENT FOR AN ELECTRONIC DEVICE

(71) Applicant: Apple Inc., Cupertino, CA (US)

(72) Inventors: Christopher M. Werner, San Jose, CA (US); Maegan K. Spencer, Emerald Hills, CA (US); Daniel J. Barrett, Redwood City, CA (US); Brad G. Boozer, Saratoga, CA (US); Daniel J. Hiemstra, San Jose, CA (US); Christopher D. Guichet, Mountain View, CA (US); Amin M. Younes, Mountain View, CA (US); James G. Horiuchi, Fresno, CA (US); Eugene H. Fox, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/836,955

(22) Filed: Dec. 11, 2017

Related U.S. Application Data

(60) Provisional application No. 62/557,131, filed on Sep. 11, 2017.

(51) Int. Cl.
*H05K 5/02* (2006.01)
*G06F 1/16* (2006.01)
(Continued)

(52) U.S. Cl.
CPC .......... *H05K 5/0213* (2013.01); *G06F 1/163* (2013.01); *G06F 1/1637* (2013.01);
(Continued)

(58) Field of Classification Search
CPC ..... H05K 5/0213; G06F 1/1637; G06F 1/163; G06F 1/1656; G06F 3/041; G06F 3/02;
(Continued)

(56) References Cited

U.S. PATENT DOCUMENTS

| 3,950,627 A | 4/1976 | Murata et al. |
| 5,041,330 A | 8/1991 | Heerton et al. |

(Continued)

FOREIGN PATENT DOCUMENTS

| CN | 102565149 | 7/2012 |
| CN | 104517772 | 4/2015 |

(Continued)

OTHER PUBLICATIONS

Author Unknown, "What to Do when Gadgets Get Wet," http://gadgetshow.channel15.com/gadget-show/blog/what-to-do-when-gadgets-get-wet, 2 pages, Aug. 23, 2010.

*Primary Examiner* — Dimary Lopez Cruz
*Assistant Examiner* — Abhishek Rathod
(74) *Attorney, Agent, or Firm* — Brownstein Hyatt Farber Schreck, LLP

(57) ABSTRACT

Embodiments are directed to a portable electronic device having a substantially concealed barometric vent. The vent may be used to equalize air pressure within the enclosure while forming a barrier between external contaminants, moisture, and so on and various internal component and assemblies of the device. In one embodiment, the vent may include a screen configured to impede ingress of particulates and an air-permeable membrane configured to impede ingress of moisture.

20 Claims, 17 Drawing Sheets

(51) Int. Cl.
*G06F 3/02* (2006.01)
*G06F 3/041* (2006.01)
*H04R 1/02* (2006.01)
*H04R 1/44* (2006.01)
*H04R 1/08* (2006.01)

(52) U.S. Cl.
CPC .............. *G06F 1/1656* (2013.01); *G06F 3/02* (2013.01); *G06F 3/041* (2013.01); *H04R 1/023* (2013.01); *H04R 1/086* (2013.01); *H04R 1/44* (2013.01); *H04R 2499/11* (2013.01)

(58) Field of Classification Search
CPC . G06F 15/0208; H04R 2499/11; H04R 1/023; H04R 1/44; H04R 1/086
See application file for complete search history.

(56) References Cited

U.S. PATENT DOCUMENTS

| | | | |
|---|---|---|---|
| 5,179,505 A | 1/1993 | Matsuo | |
| 5,258,592 A | 11/1993 | Nishikawa et al. | |
| 5,373,487 A | 12/1994 | Crawford et al. | |
| 5,889,737 A * | 3/1999 | Alameh | G04C 10/00 368/204 |
| 6,166,662 A | 12/2000 | Chuang | |
| 6,292,358 B1 | 9/2001 | Lee et al. | |
| 6,389,143 B1 | 5/2002 | Leedom et al. | |
| 6,501,036 B2 | 12/2002 | Rochon et al. | |
| 6,855,173 B2 | 2/2005 | Ehrnsperger et al. | |
| 6,963,039 B1 | 11/2005 | Weng et al. | |
| 7,075,781 B2 | 7/2006 | Peng | |
| 7,087,850 B1 | 8/2006 | Murzanski | |
| 7,230,196 B2 | 6/2007 | Toyama | |
| 7,355,137 B2 | 4/2008 | Kawasaki et al. | |
| 7,361,859 B2 | 4/2008 | Yoshioka et al. | |
| 7,365,281 B2 | 4/2008 | Yamaguchi et al. | |
| 7,580,533 B2 | 8/2009 | Schwartz | |
| 7,748,272 B2 | 7/2010 | Kranz et al. | |
| 7,764,936 B2 | 7/2010 | Nakasano et al. | |
| 7,850,378 B1 | 12/2010 | Ligtenberg et al. | |
| 7,865,210 B2 | 1/2011 | Wang et al. | |
| 8,050,716 B2 * | 11/2011 | Shin | H04B 1/385 368/10 |
| 8,059,490 B2 | 11/2011 | Rapps et al. | |
| 8,092,691 B2 | 1/2012 | Youngs et al. | |
| D653,640 S | 2/2012 | Kwon et al. | |
| 8,178,808 B2 | 5/2012 | Strittmatter et al. | |
| 8,231,795 B2 | 7/2012 | Martin et al. | |
| 8,263,886 B2 | 9/2012 | Lin et al. | |
| 8,299,601 B2 | 10/2012 | Oka et al. | |
| 8,367,928 B2 | 2/2013 | Hsu et al. | |
| 8,371,866 B1 | 2/2013 | Su et al. | |
| 8,381,575 B2 | 2/2013 | Seo | |
| 8,416,542 B2 | 4/2013 | Nakamura | |
| 8,446,713 B2 | 5/2013 | Lai | |
| 8,462,514 B2 | 6/2013 | Myers et al. | |
| 8,470,252 B2 | 6/2013 | Odueyungbo | |
| 8,500,348 B2 | 8/2013 | Dumont et al. | |
| 8,482,305 B2 | 9/2013 | Johnson | |
| 8,526,175 B2 | 9/2013 | Yukawa et al. | |
| 8,562,095 B2 | 10/2013 | Alleyne et al. | |
| 8,591,240 B2 | 11/2013 | Jenks | |
| 8,614,897 B2 | 12/2013 | Tang | |
| 8,624,144 B2 | 1/2014 | Chiang | |
| 8,644,011 B2 | 2/2014 | Parkinson | |
| 8,683,861 B2 | 4/2014 | Humbert et al. | |
| 8,767,381 B2 | 7/2014 | Shukla et al. | |
| 8,770,996 B2 | 7/2014 | Hsu | |
| 8,800,764 B2 | 8/2014 | Wu | |
| 8,804,993 B2 | 8/2014 | Shukla et al. | |
| 8,826,558 B2 | 9/2014 | Priebe et al. | |
| 8,844,158 B2 | 9/2014 | Dehn | |
| 8,942,401 B2 | 1/2015 | Murayama | |
| 8,960,818 B2 | 2/2015 | Myers et al. | |
| 8,994,827 B2 | 3/2015 | Mistry et al. | |
| 9,013,888 B2 | 4/2015 | Trzaskos et al. | |
| 9,072,991 B2 | 7/2015 | Winters et al. | |
| 9,080,961 B2 | 7/2015 | Adachi | |
| 9,084,053 B2 | 7/2015 | Parkins | |
| 9,084,357 B2 | 7/2015 | Shedletsky et al. | |
| 9,099,264 B2 | 8/2015 | Shedletsky et al. | |
| 9,105,420 B2 | 8/2015 | Shah et al. | |
| 9,129,757 B2 | 9/2015 | Kanbayashi et al. | |
| 9,161,434 B2 | 10/2015 | Merz et al. | |
| 9,164,539 B2 | 10/2015 | Wu | |
| 9,171,535 B2 | 10/2015 | Abe et al. | |
| 9,226,076 B2 | 12/2015 | Lippert et al. | |
| 9,240,292 B1 | 1/2016 | Lapetina | |
| 9,253,297 B2 | 2/2016 | Abe et al. | |
| 9,335,355 B2 | 5/2016 | Menzel et al. | |
| 9,363,589 B2 | 6/2016 | Lippert et al. | |
| 9,367,104 B2 | 6/2016 | Liu | |
| 9,387,647 B2 | 7/2016 | Wei et al. | |
| 9,529,391 B2 | 12/2016 | Ely | |
| 9,573,165 B2 | 2/2017 | Weber et al. | |
| 9,625,944 B2 | 4/2017 | Weber | |
| 9,627,797 B2 | 4/2017 | Song et al. | |
| 9,648,744 B2 | 5/2017 | Wittenberg et al. | |
| D790,517 S * | 6/2017 | Akana | D14/244 |
| 9,880,523 B2 | 1/2018 | Suwald | |
| 9,939,783 B2 * | 4/2018 | Hilario | G04B 37/00 |
| 9,980,026 B2 | 5/2018 | Zadesky et al. | |
| 10,021,800 B1 * | 7/2018 | Zhang | H04M 1/035 |
| 2006/0210062 A1 | 9/2006 | DeMichele et al. | |
| 2007/0003081 A1 | 1/2007 | Ram et al. | |
| 2008/0302641 A1 | 12/2008 | Su | |
| 2009/0002941 A1 * | 1/2009 | Mongia | G06F 1/20 361/690 |
| 2009/0245565 A1 * | 10/2009 | Mittleman | H04M 1/035 381/365 |
| 2009/0272195 A1 * | 11/2009 | Chouraku | H05K 5/0213 73/706 |
| 2009/0281251 A1 | 11/2009 | Bae et al. | |
| 2010/0232861 A1 | 9/2010 | Shibata et al. | |
| 2011/0103621 A1 | 5/2011 | Lutz | |
| 2012/0067711 A1 | 3/2012 | Yang | |
| 2013/0037396 A1 | 2/2013 | Yu | |
| 2013/0043115 A1 | 2/2013 | Yang et al. | |
| 2013/0146491 A1 | 6/2013 | Ghali et al. | |
| 2013/0170685 A1 | 7/2013 | Oh et al. | |
| 2013/0242481 A1 | 9/2013 | Kim et al. | |
| 2015/0163572 A1 * | 6/2015 | Weiss | H04R 1/02 381/337 |
| 2015/0212541 A1 * | 7/2015 | Lu | G04G 17/02 361/679.03 |
| 2015/0295617 A1 * | 10/2015 | Lai | H04B 1/3888 455/575.8 |
| 2015/0319534 A1 * | 11/2015 | Lippert | H04R 1/023 381/165 |
| 2016/0037243 A1 * | 2/2016 | Lippert | H04R 1/023 381/166 |
| 2016/0058375 A1 * | 3/2016 | Rothkopf | G06F 1/1643 600/301 |
| 2016/0088880 A1 * | 3/2016 | Tulloch | H01R 31/06 439/37 |
| 2016/0378142 A1 * | 12/2016 | Cardinali | G06F 1/1656 361/679.56 |
| 2016/0379767 A1 | 12/2016 | Ely | |
| 2017/0030851 A1 * | 2/2017 | Kardassakis | H02H 5/083 |
| 2017/0086321 A1 * | 3/2017 | de Jong | H05K 5/0213 |
| 2017/0094796 A1 | 3/2017 | Lor et al. | |
| 2017/0181303 A1 * | 6/2017 | Li | B29C 45/2618 |
| 2017/0201826 A1 * | 7/2017 | Zhang | H05K 5/0213 |
| 2018/0068808 A1 | 3/2018 | Wang et al. | |

FOREIGN PATENT DOCUMENTS

| | | |
|---|---|---|
| CN | 105049966 | 11/2015 |
| CN | 204906680 | 12/2015 |
| CN | 105323674 | 2/2016 |
| EP | 0799747 | 10/1997 |
| EP | 2326106 | 5/2011 |

(56) References Cited

FOREIGN PATENT DOCUMENTS

| | | |
|---|---|---|
| EP | 2640042 | 9/2013 |
| JP | S5620399 | 2/1981 |
| JP | 200353872 | 2/2003 |
| JP | 200483811 | 3/2004 |
| JP | 2004235724 | 8/2004 |
| JP | 2004244607 | 9/2004 |
| JP | 2011187298 | 9/2011 |
| JP | 2012253426 | 12/2012 |
| WO | WO2012/117476 | 9/2012 |
| WO | WO2015/167848 | 11/2015 |

* cited by examiner

CONCEALED BAROMETRIC VENT FOR AN ELECTRONIC DEVICE

CROSS-REFERENCE TO RELATED APPLICATION(S)

This application is a nonprovisional patent application of and claims the benefit of U.S. Provisional Patent Application No. 62/557,131, filed Sep. 11, 2017 and titled "Concealed Barometric Vent for an Electronic Device," the disclosure of which is hereby incorporated herein by reference in its entirety.

FIELD

The described embodiments relate generally to barometric vents of an electronic device. More particularly, the present embodiments relate moisture and contaminant barriers of a barometric vent and assemblies that may conceal the barometric vent from a user.

BACKGROUND

In electronic devices, an internal cavity of a device enclosure may have a nominal internal air pressure. If this internal air pressure cannot be equalized with an external environment, then the device or its constituent components may warp, break, or cease functioning in high-pressure environments. Accordingly, electronic devices expected to be subjected to high-pressure environments may incorporate a barometric vent.

In some cases, barometric vents may be a path for ingress of foreign contaminants, like dirt, dust, oils, debris, liquids, and other contaminants. Internal components of electronic devices are often susceptible to these contaminants. Further, exposed barometric vents may be plugged by contaminants, reducing their ability to function.

SUMMARY

Embodiments of the present disclosure are directed to a barometric vent for an electronic device that defines a moisture or contaminant barrier. Structures and assemblies are disclosed herein that may conceal the barometric vent from a user.

In a first aspect, the present disclosure includes an electronic device. The electronic device includes an enclosure defining an interior volume, an engagement feature, and an outer port extending from an inner surface of the interior volume to a surface of the engagement feature. The electronic device further includes a display at least partially positioned within the enclosure. The electronic device further includes a watch band that is coupled to the engagement feature of the enclosure. The electronic device further includes a vent assembly positioned within the interior volume of the enclosure and aligned with the outer port. The watch band visually obscures the outer port when positioned within the engagement feature.

In a second aspect, the present disclosure includes an electronic device. The electronic device includes an enclosure having a sidewall and an outer port defined within the sidewall. The electronic device further includes a bracket positioned within the enclosure and defining an inner port. The electronic device further includes a vent assembly secured between the bracket and an the enclosure. The vent assembly may include a duct region that forms at least part of a passage between the outer port and the inner port. Within the duct region, the vent assembly further includes an air-permeable membrane defining a moisture barrier and a screen stacked along the air-permeable membrane.

In a third embodiment, the present disclosure includes an electronic device. The electronic device includes an enclosure having an outer port. The electronic device further includes a vent assembly positioned within the enclosure and defining a duct region configured to channel air between the outer port and an interior volume of the enclosure. The vent assembly includes an air-permeable membrane extending across the duct region and defining a moisture barrier. The electronic device further includes an input member at least partially overlapping the outer port.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

Figure 1:
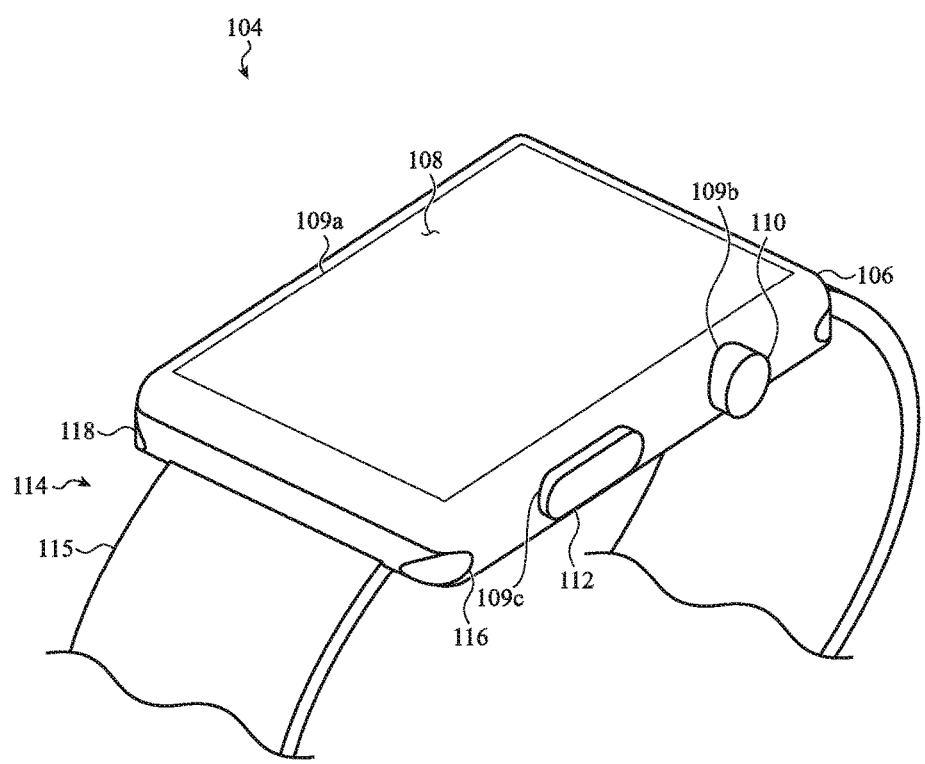
FIG. 1 depicts a sample electronic device having a concealed vent assembly.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to a barometric vent for an electronic device. An electronic device, such as a wearable or portable electronic device, may have an internal cavity that contains various components and assemblies of the device (printed circuit board, sensors, switch, and so on). The cavity may be substantially sealed from an external environment in order to prevent or mitigate the ingress of contaminants such as oils, dust, and/or other debris that may interfere with the device. A nominal air pressure within the cavity may change as a user interacts with the device (providing input to a force-sensitive surface) and/or due to external environment changes, including sudden altitude or weather changes. The electronic device may include a barometric vent, or other vent assembly, configured to equalize the pressure within the cavity to that of the external environment. The vent assembly may equalize the pressure while shielding the components and assemblies of the electronic device from potential contaminants, including by serving as a moisture barrier.

The vent assembly may include or be associated with an outer port or opening defined on an exterior surface of the electronic device that allows for the passage of air. The outer port may be positioned on the exterior surface in order to aesthetically, structurally, and/or functionally enhance the electronic device. For example, the outer port may be positioned relative to (or partially within) an external component or assembly of the electronic device, including a button, crown, band, lug/receiving slot, fastener, or the like. The external component or assembly may visually obstruct or camouflage the outer port, thereby allowing the outer port to be substantially concealed from a user. As described herein, the outer port, component, and/or assembly may be configured to maintain adequate airflow through the vent assembly despite being substantially concealed.

The vent assembly may include various combinations and embodiments of films, membranes, substrates, screens, stiffeners, perforated members, and/or other layers that cooperate to allow air to enter and/or exit the cavity slowly while mitigating the ingress of potential contaminants. The layers may form a duct region that defines a fluid path between the outer port and an inner port positioned within the cavity. In a sample embodiment, the vent assembly includes an air-permeable membrane that forms a water-resistant moisture barrier across the duct region. Air may pass through the membrane in a restricted or controlled manner, which may help equalize the pressure within the cavity or otherwise reduce a pressure differential between the cavity and an external environment of the device. One or more screens (including perforated members, mesh layers, stiffeners, and so on) may be positioned on either side of the membrane to prevent mechanical abrasion of the membrane (from particulates or other debris). The screens may also provide a physical support or backing for the membrane as it bows within the duct region due to passage of air. In some embodiments, a film may also extend across the duct region and may be used to test an air seal of the vent assembly; the film may be subsequently punctured to allow air to pass. The layers of the substrate may be bonded to one another using one or more interstitial layers, such as pressure sensitive adhesive (PSA) or thermoset adhesive (TSA).

It will be appreciated that the various layers of the membrane are presented for purposes of illustration. The vent assembly may include various other layers, as described herein, to facilitate the function of the vent assembly. For example, the vent assembly may also include a deformable foam layer that presses down (compresses) the various layers bonded by the interstitial layers, which may enhance the structural rigidity of the vent assembly. A bracket (or other substrate or rigid component) may be fastened to the device internally and may compress the deformable layer in order to stabilize the vent assembly within the cavity. Other sample layers include a spacer, overmolded mesh layer, and so on. Accordingly, other layers and stackups of the vent assembly are contemplated within the scope of the present disclosure.

The electronic device may be a watch or other wearable or portable electronic device having a vent assembly. The watch may have an enclosure that defines the outer port of the vent assembly. By selectively positioning the outer port relative to (or partially within) an external component of the watch, the outer port may be at least partially shielded from contaminants. This may also help maximize a continuous or uninterrupted (by holes) visible surface of the watch body, which may enhance the aesthetic and function of the device. Accordingly, it will be appreciated that the outer port may be positioned in a variety of locations so that the vent assembly is substantially concealed from a user, and/or such that the port is shielded from direct entry of contaminants in an external environment. Put another way, a component of the electronic device may act as a barrier to contaminants entering the port along a straight path.

In an example embodiment, the vent assembly may be substantially concealed within an engagement feature defined in the watch body. The engagement feature may be one of a pair of receiving slots that operate to temporarily constrain or releasably couple a lug of a watch band. The lug includes a locking mechanism that engages a retention feature (hole defined in an internal contoured surface of the slot) so that the watch band may be used to secure the watch body to a user. When the watch is worn by a user, the watch band thus conceals the outer port of the vent assembly. Sufficient clearance between the lug and an engagement feature surface may allow air to pass through the vent assembly substantially unobstructed.

As another example, the vent assembly may be substantially concealed from a user within a retention feature. The retention feature may be an opening or through portion of the watch body that receives the locking mechanism, temporarily constraining the lug within the slot when the watch is worn by a user. The retention feature may also house a button or other release member that may be pressed to disengage the lug. As such, one or more of the locking mechanism, release member, and/or component or structure within the retention feature may operate to conceal the outer port without substantially constricting airflow to the vent assembly.

The enclosure may also include various openings for distinct input structures, including a button, crown, and so on that may also be used to conceal the vent assembly. For example, the outer port may be defined in a side wall or a base portion that partially receives the input structure but is spaced or offset so as to provide the needed clearance for the port. In some cases, fasteners with a through hole may be used in conjunction with any of the foregoing to facilitate flow of air through the vent assembly.

Camouflaging or concealing the vent assembly may also be accomplished by forming a shared internal volume within the watch body cavity so that multiple components or assemblies of the device are fluidically coupled to the external environment through a single port. For example, the device may include a microphone, a speaker, and/or other acoustic components that require the flow of air from and/or toward the external environment. An internal volume may be defined within the cavity that is shared by all or a subset of such components. The shared internal volume may be coupled with a single outlet defined on an exterior surface of the watch body that allows air to reach the components, thereby reducing externally visible holes of the watch. Additionally or alternatively, when multiple holes are defined on the exterior surface, the holes may appear uniform, even when each corresponds to a distinct component of the device.

It will be appreciated that while the foregoing presents sample embodiments of concealing a vent assembly for a watch, other embodiments are possible. For example, the vent assembly may be used with substantially any portable electronic device, including a smart phone that may be vented to an external environment for pressure equalization. Substantially non-portable electronic devices, including desktop computers, may also use the barometric vents described herein, as may be appropriate for a given application.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts an example electronic device 104 having an enclosure 106 and a display 108 (which may be touch-sensitive) incorporated therein. The display 108 may be at least partially positioned within the enclosure 106 and used to receive an input that may facilitate control of the electronic device 104. When force or touch input is received at the display 108, an internal pressure within the enclosure 106 may vary. For example, the electronic device 104 may include a touch sensor, proximity sensor, and/or force sensor that detects capacitive, magnetic, optical, strain, or other characteristics to register input. The electronic device 104 may include one or more vent assemblies, such as the vent assembly discussed above and described in greater detail below. As described herein, the vent assembly (not shown in FIG. 1) may be configured to equalize a nominal air pressure within the enclosure 106 with an external pressure of a surrounding external environment; this may be accomplished in a slow or controlled manner, as may be appropriate for a given application. The vent assembly may be substantially concealed from a user when the electronic device 104 is in an assembled configuration shown in FIG. 1. As such, the vent assembly may equalize the nominal air pressure without overtly alerting the user to such functionality of the electronic device 104.

As shown, the electronic device 104 (or "device 104") is a watch, though it can be any suitable electronic device, including, for example, a smart phone, desktop computer, an accessory or gaming device. Other example electronic devices include notebook computers, tablets, portable media players, other patches, pencils, and/or other appropriate electronic devices, including other wearable devices, health monitoring devices, digital cameras, printers, scanners, security systems or devices, and/or electronics for automobiles, among other electronic devices. As such, the discussion of any electronic device, such as electronic device 104, is meant to be illustrative only.

As shown in the embodiment of FIG. 1, the enclosure 106 may define multiple openings that are configured to at least partially receive various components and assemblies of the electronic device 104. In particular, the enclosure 106 may define a first opening 109a, a second opening 109b, and a third opening 109c; however, additional or fewer openings are possible and described herein. The display 108 may be at least partially received by the first opening 109a, which may be formed into a top surface of the enclosure 106. The display 108 may thus define a watch face of the electronic device 104 configured to receive a touch input. The second opening 109b and the third opening 109c may be configured to receive various input structures of the electronic device 104.

For example, the electronic device 104 may include a crown 110 at least partially received by the second opening and a button 112 at least partially received by the third opening 109c. The crown 110 may rotate and/or translate within the second opening 109b and the button 112 may translate within the third opening 109c in order to receive a rotational input and/or a translational input from a user. This may be used to control a function of the electronic device 104 using rotational or translational input from a user. For example, the display 108 may depict a graphical output of the electronic device 104 (including indicia, symbols, text, icons, notifications, and so on) that is responsive to the movements of the crown 110 and/or the button 112. Rotation may scroll or move input or vice versa translation may select input. Translation may also be used to transition the electronic device 104 between one or more configurations. For example, the translation may return a group of graphical objects (icons) to the display 108.

The electronic device 104 may also include a watch band 114. The watch band 114 may be used to secure the watch body (e.g., enclosure 106) to a user. The watch band 114 may be releasably coupled with the enclosure 106. For example, the watch band 114 may include rigid members, such as lug 118, that are connected to a flexible strap 115. The lug 118 may be received by an engagement feature 116 or other elongated groove or receiving slot formed into the enclosure 106. The enclosure 106 may include a pair of slots on opposing sides of the enclosure 106 such that that flexible strap 115 may encircle a user's wrist or other body portion and couple with each of the slots, thereby securing the device 104 to a user.

Figure 2:
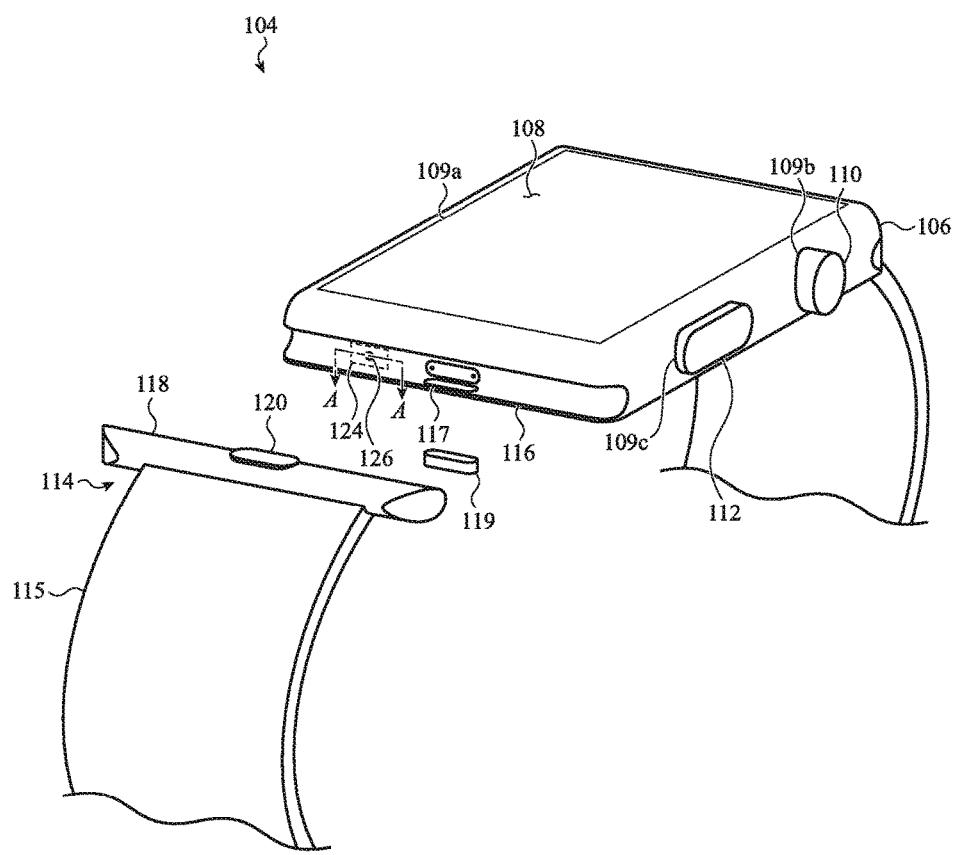
FIG. 2 depicts an exploded view of the electronic device of FIG. 1, showing an outer port of the concealed vent assembly.

FIG. 2 depicts an exploded view of the electronic device 104. In the exploded view of FIG. 2, the watch band 114 is shown detached from the enclosure 106. In one embodiment, the watch band 114 may detach from the enclosure 106 by sliding the lug 118 laterally within the engagement feature 116. The contoured shape of the engagement feature 116 may establish sufficient clearance for the lug 118 to slide along the lateral, elongated direction, while also restricting movement in a perpendicular direction, away from the enclosure 106. The engagement feature 116 may define a retention feature 117 or opening that is configured to at least partially receive a locking mechanism 120 of the lug 118 to restrict the lateral, sliding movement and secure the watch band 114 to the enclosure 106. For example, when the lug 118 is advanced or slid into the engagement feature 116, the locking mechanism 120 may expand into the retention feature 117, and lock or temporarily fix a position of the lug 118 within the engagement feature 116. The retention feature 117 may also house a release member 119. The release member 119 may be pressed to disengage the locking mechanism 120 from the retention feature 117 and allow the lug 118 to slide through the engagement feature 116, thereby permitting detachment of the watch band 114 from the enclosure 106.

As described herein, the electronic device 104 may include one or more barometric vents or similar assemblies that allow ingress and/or egress of air between an internal volume of the enclosure 106 and an external environment. To facilitate the foregoing, a hole, opening, port, or the like is defined on an external surface of the enclosure 106 that allows air to pass. The vent assembly may be an internal assembly that controls ingress and egress of air therethrough and also provides a barrier against potential contaminants, such as moisture, oils, dust, debris, and so on that may otherwise attempt to enter the internal volume through the opening defined on the external surface of the enclosure. According to the embodiments of the present disclosure, the vent assembly (and associated opening, port, or the like) may be substantially concealed from a user.

As shown in FIG. 2, the electronic device includes a vent assembly 124 (shown in phantom). The vent assembly 124 may be an internal assembly of the electronic device 104 that is not readily visible by viewing an exterior surface of the enclosure 106. As described in greater detail below with respect to FIGS. 3A and 3B, the vent assembly 124 may include various films, membranes, layers, substrates, and so on that cooperate to form a moisture barrier that allows air to enter and/or exit the enclosure 106 slowly, while mitigating the ingress of potential contaminants. Visible on the exterior of the enclosure 106 is an outer port 126. The outer port 126 may be a hole or opening defined in the enclosure 106 that defines a fluid path into (and out of) the vent assembly 124. For example, the outer port 126 may extend from an inner surface of an interior volume of the enclosure 106 to the engagement feature 126.

In the embodiment of FIG. 2, the outer port 126 may be defined within the engagement feature 116. For example, the outer port 126 may be an opening or through portion extending into an internal volume or cavity of the enclosure 106 from a contoured interior surface of the engagement feature 116. The vent assembly 124 may thus be positioned within the internal volume relative to the engagement feature 116 in order to receive and expel air via the outer port 126. As shown in the sample embodiment of FIG. 2, the outer port 126 may be position offset from a middle of the electronic device 104.

The contoured interior surface of the engagement feature 116 may not be visible to a user when the watch band 114 is coupled with the enclosure 106. For example, as shown in FIG. 1, when the lug 118 is advanced into the engagement feature 116, the lug 118 visually obscures the contoured interior surface. As such, the lug 118 may conceal the outer port 126 and the vent assembly 124 from view. Accordingly, the watch band 114 may visually obscure the outer port 126 when positioned within the engagement feature 116. Despite being covered or partially covered by the lug 118, air may still flow substantially unobstructed into (and out of) the outer port 126, although the lug 118 may inhibit direct entry of contaminates. For example, the lug 118 and the contoured interior surface of the engagement feature 116 may be offset or separated slightly, thereby providing clearance between the lug 118 and the engagement feature 116 for the passage of air while impeding contaminant entry into the outer port 126.

Figure 3A:
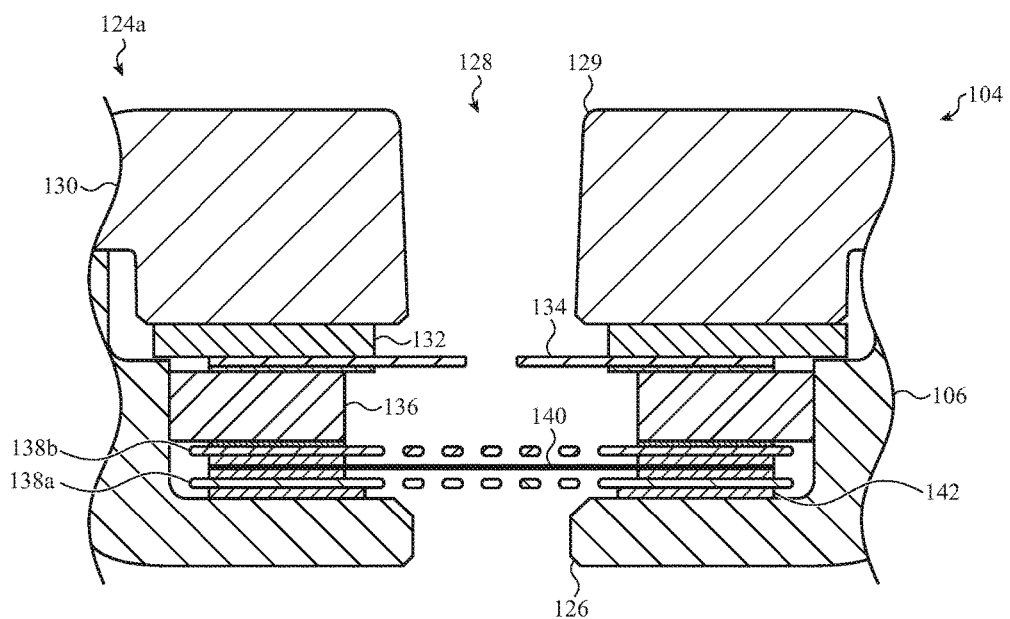
FIG. 3A depicts a cross-sectional view of a vent assembly, taken along line A-A of FIG. 2.
Figure 3B:
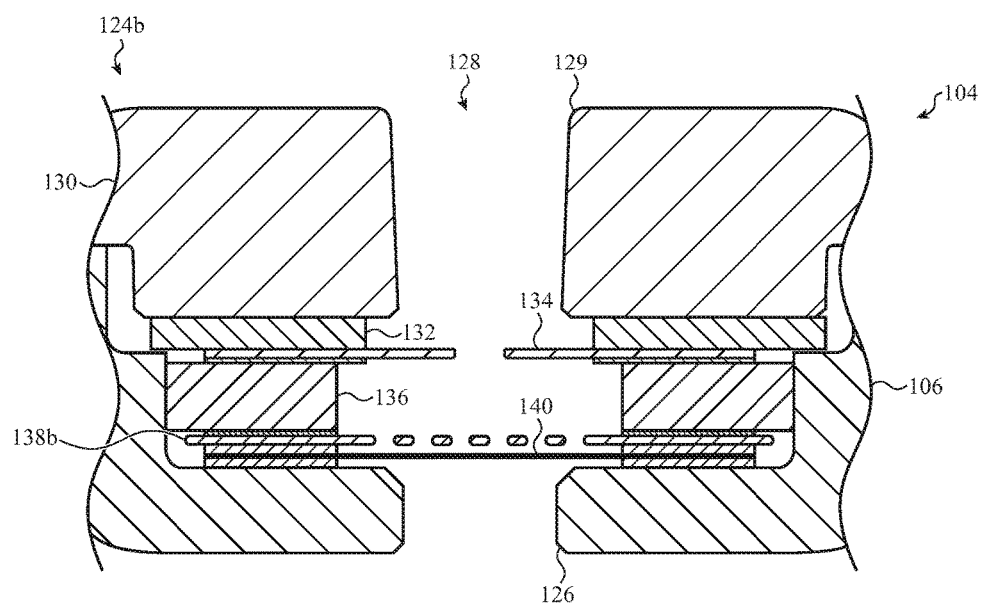
FIG. 3B depicts a cross-sectional view of another embodiment of a vent assembly, taken along line A-A of FIG. 2.
Figure 3C:
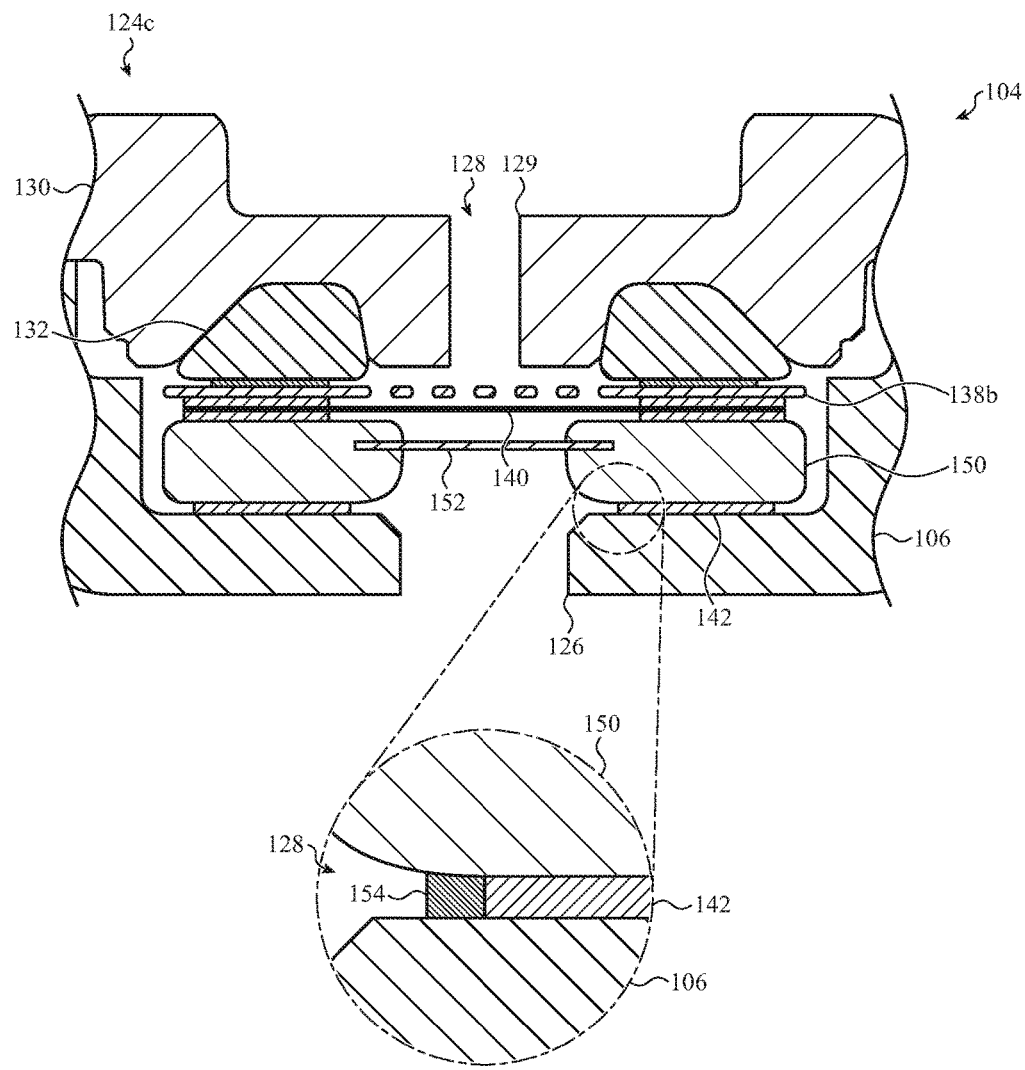
FIG. 3C depicts a cross-sectional view of another embodiment of a vent assembly, taken along line A-A of FIG. 2.

FIGS. 3A-3C depict embodiments of vent assemblies of the present disclosure. Broadly, the vent assemblies may include a duct region that defines a fluid path between an outer port (on a surface of a device enclosure) and an inner port positioned within an internal volume of the enclosure. The duct region may extend through a stack up of the various films, membranes, screens, adhesives, and/or other layers described herein below. Some of the layers may extend at least partially over (across) the duct region so as to be substantially positioned along the fluid path. Such layers may control, mitigate, and/or prevent (as may be appropriate) the flow of air, moisture, oil, particulates, and/or other contaminants through the duct region. The vent assembly may be positioned at substantially any location within the enclosure 106 corresponding to a position of the outer port on the exterior surface. As described herein, the outer port may be positioned in various configurations along the exterior surface in order to conceal the vent assembly from a user. As such, it will be appreciated that the vent assemblies described with respect to FIGS. 3A-3C (or any other embodiments or variations of the vent assembly) may be used or coupled with any of the outer ports described herein.

With reference to FIG. 3A, a cross-sectional view of a vent assembly 124a is shown, taken along line A-A of FIG. 2. In this regard, the vent assembly 124a may be a sample embodiment of the vent assembly 124 described with respect to FIG. 2; however, other embodiments are possible and described in greater detail below, for example, with respect to FIGS. 3B and 3C. The vent assembly 124a may include a stackup of layers that cooperate to define a duct region 128 between the outer port 126 and an inner port 129 positioned within an interior volume of the enclosure 106. As shown in FIG. 3A, the vent assembly 124 may include a bracket 130, a deformable layer 132, a film 134, a first screen 138a, a membrane 140, a second screen 138b, and one or more interstitial layers 142. The first screen 138a and the second screen 138b may positioned along or otherwise be stacked relative to one another. The interstitial layers 142 may be adhesive or bonding layers (including pressure sensitive adhesive and/or thermoset adhesive layers) that couple the other layers and films of the vent assembly 124 to one another to collectively form the duct region 128. While FIG. 3A depicts the foregoing layers of the vent assembly 124, and are described in detail below, other layers and configurations are possible, including embodiments in which the vent assembly has more or fewer layers than that depicted with respect to FIG. 3A.

The first screen 138a may extend across the duct region 128. The first screen 138a may be a perforated layer configured to provide a physical and/or chemical resistant barrier that prevents or mitigates the ingress of contaminants into the vent assembly 124. Such contaminants may include particulates and/or other debris that may damage or impair the membrane 140 or other components of the vent assembly 124. Contaminants may also include oils, liquids, and/or other chemically corrosive elements that may adversely affect components of the electronic device 104. The first screen 138a may be formed from a chemically resistive material, such as stainless steel. Contaminants laced with, or carrying, corrosive elements may thus be blocked by the physical barrier formed by the first screen 138a and the stainless steel construction may prevent deterioration of the first screen 138a upon contact with the intruding materials.

To facilitate the foregoing, the first screen 138a may be coupled or stacked along an interior surface of the enclosure 106 at the outer port 126, for example, using one or more of the interstitial layers 142. Air may pass through the first screen 138a. The perforations may, however, have a size and a shape that prevents or impedes the passage of liquids and/or other contaminants. The first screen 138a may also provide a physical support or backing for the membrane 140 as it bows within the duct region 128 in response to, for example, air exiting the enclosure 106, thereby limiting deformation of the membrane 140 under pressure or preventing it from rupturing.

The membrane 140 may be an air-permeable membrane that is coupled to the first screen 138a and that extends across the duct region 128. For example, one or more of the interstitial layers 142 may be used to bond the membrane 140 to the first screen 138a, opposite the outer port 126. The membrane 140 may be relatively thin, for example, such as being approximately 0.05-0.15 mm; however, other dimensions are possible, including being greater than 0.15 mm or less than 0.15 mm. As such, as air travels through the membrane 140 (or pressure is otherwise exerted on the membrane 140 within the duct region 128), the membrane 140 may bow or otherwise deflect. The first screen 138a may prevent bowing of the membrane 140 beyond a specified point. The second screen 138b may perform a similar function, as described below.

The membrane 140 may be a composite structure formed from an array of interlocking fibers. The interlocking fibers may define a porosity of the membrane 140, for example based on a density or compactness of the fibers across the membrane 140. The porosity may be such that air is allowed to travel through the membrane 140 in a restricted or controlled manner. This may help equalize the pressure within the enclosure 106 slowly. In other cases, air may pass through the membrane 140 substantially unobstructed, thereby allowing relatively rapid or near-instantaneous pressure equalization.

The membrane 140 may form a water-resistant seal or moisture barrier across the duct region 128. For example, membrane 140 may impede, mitigate, or substantially prevent the flow of water, moisture, and oils, into the vent assembly 124. Specifically, the porosity of the membrane 140 may be sufficiently low, such that at a nominal pressure, water and other contaminants may not readily traverse the membrane 140. This may help provide waterproofing for the electronic device 104. It will be appreciated that the density or compactness of the interlocking fibers may be specified in any appropriate manner, as may be appropriate to control a porosity of the membrane 140. This may be beneficial to control the flow of air through the membrane 140 (calibrating the resistance of the membrane 140 to air traveling through the vent assembly 124) and/or the extent of waterproofing desired for the electronic device 104.

The second screen 138b may be a perforated layer that extends across the duct region 128. The second screen 138b may provide a physical support or backing for the membrane 140 as it bows within the duct region 128 in response to, for example, air entering the enclosure 106. To facilitate the foregoing, the second screen 138b may be coupled to the membrane 140, opposite the first screen 138a, using one or more of the interstitial layers 142. The second screen 138b may thus prevent bowing of the membrane 140 beyond a specified point, thereby limiting deformation of the membrane 140 under pressure or preventing it from rupturing.

The first screen 138a and the second screen 138b may thus cooperate to enhance the longevity of the membrane 140. For example, the membrane 140 may repeatedly cycle between bowing along a direction into and out of the duct region 128 as the vent assembly 124 operates to control the ingress and egress of air. Limiting the bowing to certain specified amounts (due to the physical position of the first screen 138a and the second screen 138b) may reduce stress and strain on the membrane 140 over time. Thus, the first screen 138a and the second screen 138b may reduce degradation of the membrane 140, thereby enhancing the longevity of the membrane 140 subjected to repeated, prolonged, and/or excess applications of pressure (fluid flow).

Positioned along the second screen 138b, opposite the membrane 140, is the stiffener 136, as shown in FIG. 3A. The stiffener 136 is an optional component of the vent assembly 124 that defines sidewalls of the duct region 128 and is configured to provide a specified height to the vent assembly 124 and the duct region 128. For example, the duct region 128 may extend into an internal cavity of the enclosure 106 by a specified amount (for example, due to the internal structure of the enclosure 106). This may be at least partially influenced by the position of the outer port along the exterior surface of the enclosure 106, as the dimensions, tolerances, or the like of the vent assembly 124 may change based on the position of the vent assembly 124 within the enclosure 106. The stiffener 136 may also be used to separate the membrane 140 from the film 134 by a required amount to facilitate use of the film 134 for an air seal test, as described below. The stiffener 136 also prevents shear and/or lateral movements as it abuts the enclosure 106, although this is optional.

In particular, the film 134 may be a perforated film (e.g., having a punctured section) that extends across the duct region 128. The film 134 may be used as a temporary seal to test an air seal of the vent assembly 124. For example, it may be desirable to determine that the various layers of the vent assembly 124 do not permit the flow of air or other fluids outside of the duct region 128. Stated differently, the vent assembly 124 is configured to permit the flow of air within the duct region 128 between the outer port 126 and the inner port 129; air that enters or exits the duct region 128 at other locations (such as between or through the interstitial layers) may impair the function of the vent assembly 124. As such, the film 134 may initially be an air impermeable film capped on, formed over, and/or adhered to (using interstitial layers 142) the stiffener 136. Air may be introduced into the duct region 128 (above or below the film 134) in order to determine if such air escapes from an inappropriate location within the vent assembly 124. For example, when the film 134 is air impermeable, air introduced into the outer port 126 should not leak into the internal volume of the enclosure 106. Thus, an absence of the introduced air may indicate that vent assembly 124 is suitable for in-field use of the electronic device 104.

Upon completion of the air seal test, the film 134 may be punctured to allow air to travel through the duct region 128. In one embodiment, a needle or other sharp or puncture-based instrument may be used to create one or more apertures or puncture sections in the film 134. These apertures may allow air to pass through the duct region 128 substantially unobstructed. In other cases, the apertures may be configured to control the passage of air through the duct region 128 in a controlled or restricted manner, as may be appropriate for a given application.

The deformable layer 132 may be coupled to the film 134 opposite the stiffener 136, for example, using one or more of the interstitial layers 142. The deformable layer 132 may form side walls of the duct region 128 and be used to provide an interface between the various membranes, films, layers, and so on of the vent assembly 124 and a rigid bracket (bracket 130) that connects the vent assembly 124 to an internal surface of the enclosure 106. The deformable layer 132 may be a foam layer, or other elastically deformable material that is compressed in response to a force, and substantially returns to an uncompressed or undeformed shaped when the force ceases.

Figure 4:
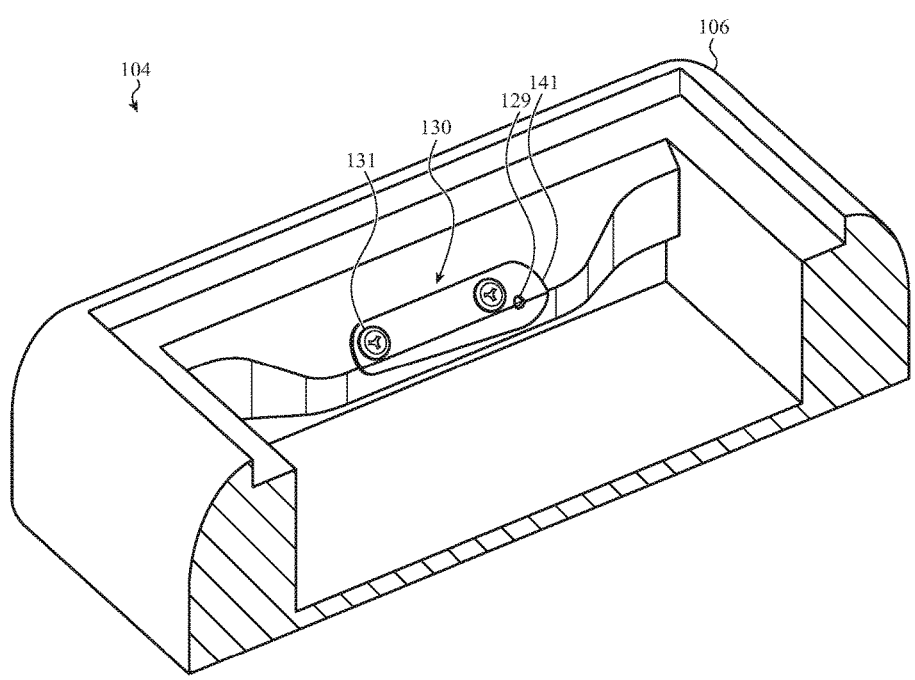
FIG. 4 depicts a cover for the vent assembly of FIG. 2, shown within an internal volume of the electronic device.

The bracket 130 may be at least partially positioned along the deformable layer 132 and used in conjunction with the deformable layer 132 to enhance the structural rigidity and stabilize the vent assembly 124 within the enclosure 106. For example, the bracket 130 may be a substantially rigid substrate or member that is fixed to an internal surface of the enclosure 106, for example, using fasteners (as shown in FIG. 4). The bracket 130 may be fastened or fixed to the internal surface such that the bracket 130 compresses the deformable layer 132. This may deform the deformable layer 132 and cause the deformable layer to press down on the various other layers, films, membranes, and so on of the vent assembly 124. The other layers of the vent assembly 124 may therefore also be compressed, which may restrict undesirable movements, thereby helping to stabilize the vent assembly 124 within the enclosure 106. This may be beneficial for the interstitial layers 142, which may be formed from a pressure sensitive adhesive; the compression from the bracket 130 may increase the adhesive properties of the interstitial layers 142 and therefore reduce possible failure mechanisms of the vent assembly 124.

With reference to FIG. 3B, a cross-sectional view of a vent assembly 124b is shown, taken along line A-A of FIG. 2. In this regard, the vent assembly 124b may be a sample embodiment of the vent assembly 124 described with respect to FIG. 2; however, other embodiments are possible and described in greater detail herein, for example, with respect to FIGS. 3A and 3C. The vent assembly 124b may be substantially analogous to the vent assembly 124a described above with respect to FIG. 3A. For example, the vent assembly 124b may be configured to facilitate equalization of pressure within a device enclosure. The vent assembly 124b may thus provide a fluid path for the ingress and egress of air between an internal volume of the enclosure and an external environment. The vent assembly 124b may also form a physical moisture barrier that prevents or impedes the ingress of contaminants, such as various liquids (including water), oils, dust, debris, and so on into the enclosure. In this regard substantially analogous to the components described above in relation to the embodiment of FIG. 3A, the vent assembly 124b may include the outer port 126, the duct region 128, the inner port 129, the bracket 130, the deformable layer, the second screen 138b, the membrane 140, and the interstitial layers 142.

Notwithstanding the foregoing similarities, the membrane 140 may be coupled along the interior of the enclosure 106 adjacent the outer port 126, for example, using one or more of the interstitial layers 142. A perforated member may not necessarily be interposed between the membrane 140 and the outer port 126. This may help optimize the size of the vent assembly 124b within the electronic device 104. For example, without an additional perforated member between the membrane 140 and the outer port 126, the distance between the membrane 140 and an external surface of the enclosure 106 may be reduced, in addition to altering other parameters of the vent assembly 124, such as modular volume, z-height, and other considerations, as may be appropriate for a given application.

With reference to FIG. 3C, a cross-sectional view of a vent assembly 124c is shown, taken along line A-A of FIG. 2. In this regard the vent assembly 124c may be a sample embodiment of the vent assembly 124 described with respect to FIG. 2; however, other embodiments are possible and described in greater detail herein, for example, with respect to FIGS. 3A and 3B. The vent assembly 124c may be substantially analogous to the vent assembly 124 described above with respect to FIG. 3A. For example, the vent assembly 124c may be configured to facilitate equalization of pressure within a device enclosure. The vent assembly 124c may thus provide a fluid path for the ingress and egress of air between an internal volume of the enclosure and an external environment. The vent assembly 124c may also form a physical moisture barrier that prevents or impedes the ingress of contaminants, such as various liquids (including water), oils, dust, debris, and so on into the enclosure. In this regard, substantially analogous to the components described above in relation to the embodiment of FIG. 3A, the vent assembly 124c may include the outer port 126, the duct region 128, the inner port 129, the bracket 130, the deformable layer 132, the second screen 138b, the membrane 140, and the interstitial layers 142.

Notwithstanding the foregoing similarities, the vent assembly 124c may include a screen 152 that extends across the duct region 128. The screen 152 may be a mesh layer composite structure formed from an array or group of intertwined structures or interlocking members. The intertwined members may thus be attached to one another and cooperate to define various through holes, openings, pockets, and so on in the screen 152. Air or other fluids (moisture) may pass through the holes or openings defined in the screen 152. The holes may be small enough, however, such that the mesh layer forms a physical barrier that prevents the ingress of potential contaminants into the enclosure 106, such as particulates, dust, and/or other debris. Contaminants may also include oils or other chemically corrosive elements that may deteriorate components of the electronic device 104. The intertwined members of the screen 152 may thus be formed from a chemical resistive material, such as stainless steel; certain fibers or synthetic materials may also be suitable choices for the screen 152, among other possible materials.

The screen 152 may be at least partially encapsulated or molded within an overmold layer 150. The overmolded layer 150 may form a compliant ring around the screen 152 to facilitate sealing or compression of the vent assembly 124. The overmold layer 150 may be coupled along an interior surface of the enclosure 106 opposite the outer port 126, for example, using one or more of the interstitial layers 142. The overmold layer 150 may define side walls of the duct region 128 that extend substantially from the outer port 126. The overmold layer 150 may be formed from a variety of moldable materials, including silicone, various plastics, ceramics, or the like. As shown in FIG. 3B, a portion of the screen 152 may extend into the overmold layer 150. For example, a peripheral edge or perimeter of the screen 152 may extend into the overmold layer 150 in order to secure the screen 152 within the duct region 128. The overmold layer 150 may allow the screen 152 to be recessed into the interior of the enclosure 106, which may enhance the aesthetics of the outer port 126. The overmold layer 150 may also prevent shear and/or lateral movement of the vent assembly 124.

In certain embodiments, the vent assembly 124c may optionally include a gasket 154. The gasket 154 may be a chemical resistant gasket that is configured to provide a physical barrier between one or more of the interstitial layers 142 and the duct region 128. For example, as shown in the detail of FIG. 3B, the gasket 154 may be an O-ring or other structure that at least partially defines a sidewall of the duct region. In the instant embodiment, the gasket 154 is shown defining a sidewall of the duct region 128 between the screen 152 and the outer port 126. This may be a sidewall of the duct region 128 that experiences corrosive chemicals or other elements from an external environment, which may act to degrade the interstitial layers 142. Accordingly, the gasket 154 may help increase the longevity of the bonded components of the vent assembly 124c by substantially sealing the adhesive materials from a corrosive external environment.

Substantially analogous to the embodiments described with respect to FIG. 3A, the membrane 140 may be used in the vent assembly 124c to prevent or impede oil, moisture, water or other contaminants from entering the interior of the enclosure 106, while allowing air to pass through. In this regard, the membrane 140 may be an air-permeable membrane that extends across the duct region 128. As shown in FIG. 3B, the membrane 140 may be coupled to the overmold layer 150 opposite the outer port 126. One or more interstitial layers 142 may be used to bond the membrane 140 to the overmold layer 150.

As shown in FIG. 3C, the second perforated member may be coupled to the membrane 140 using one or more of the interstitial layers 142. As described above, the second screen 138b may be a physical support or backing for the membrane 140 as it bows or deforms due to the passage of air. Coupled to the second screen 138b in the embodiment of FIG. 3B is the deformable layer 132. The deformable layer 132 may be configured for compression by the bracket 130, including having a size and/or shape that substantially fills or conforms to pockets or grooves defined along an underside of the bracket 130. The corresponding geometries of the underside of the bracket 130 and the deformable layer may help restrict movement of the deformable layer 132 relative to the bracket 130. As such, the deformable layer 132 may be at least partially constrained within the bracket 130 as the bracket 130 exerts a compressive force on the deformable layer 132 and various other layers of the vent assembly 124c below (e.g., due in part to fixing or fastening the bracket 130 to a rigid interior surface of the enclosure 106).

FIG. 4 depicts the bracket 130 coupled along an interior surface of the enclosure 106 of the electronic device 104. The bracket 130 may be coupled to the interior surface using one or more fasteners 131; however, other attachment techniques and structures are possible. In the instant embodiment, the fasteners 131 may extend through holes defined in the bracket 130 and be received by corresponding holes, threaded features, and so forth that may be defined with the interior surface of the enclosure 106.

As shown in FIG. 4, the bracket 130 may be or resemble a cantilevered structure. For example, at least one end of the bracket 130 may be a substantially free end that extends beyond a given one of the fasteners 131. The substantially free end may define a cantilevered portion 141 of the bracket 130. The cantilevered portion 141 may have a through hole, opening, or the like that defines the inner port 129. The vent assembly 124 (or any other vent assembly described herein) may be aligned with the inner port 129 between a sidewall of the enclosure 106 and the free end of the bracket 130. The bracket 130 may thus be used to secure the vent assembly 124 within the enclosure 106. For example, the free end of the bracket 130 may exert a compressive force on the vent assembly 124 when the bracket 130 is attached to the enclosure 106 by the fasteners 131, thereby restricting movement of the vent assembly 124 between the sidewall and the free end of the bracket 130. In some cases, the fasteners 131 may be further tightened or otherwise manipulated to vary a compressive force exerted by the bracket 130 on the vent assembly 124.

Figure 5A:
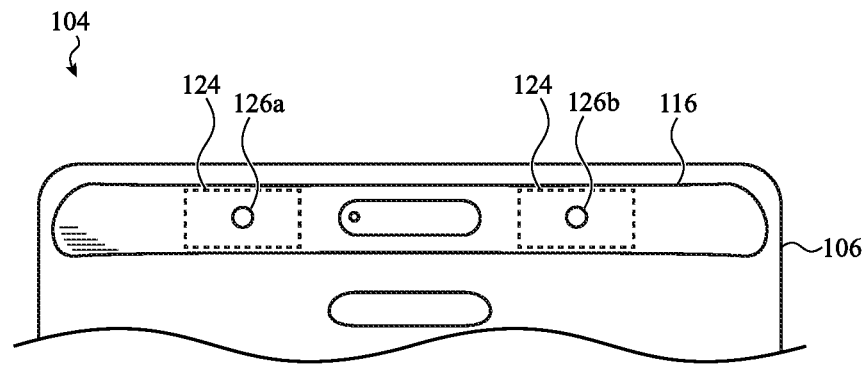
FIG. 5A depicts multiple outer ports for vent assemblies positioned along a receiving slot of an electronic device.
Figure 5B:
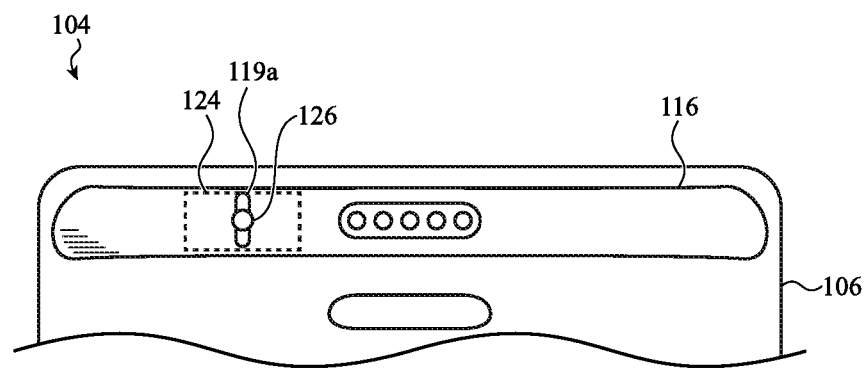
FIG. 5B depicts a vertical channel extending from an outer port defined in a receiving slot of an electronic device.
Figure 5C:
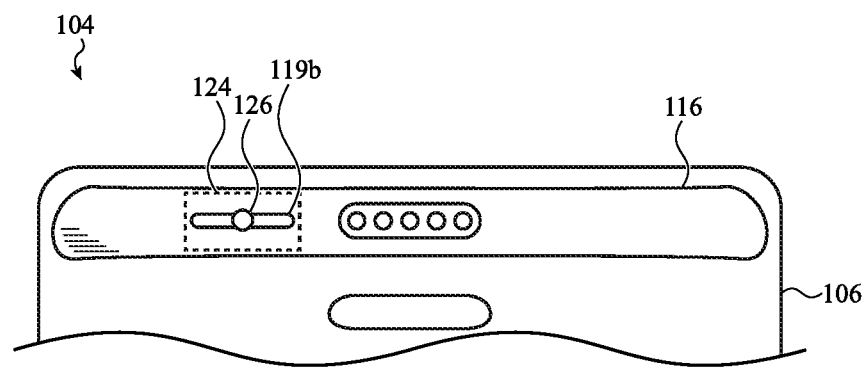
FIG. 5C depicts a horizontal channel extending from an outer port defined in a receiving slot of an electronic device.

FIGS. 5A-5C depict alternate embodiments of vent assemblies positioned along the engagement feature 116 of the electronic device 104. As described above, an outer port of a vent assembly may be defined in an interior contoured surface of the engagement feature 116. The interior contoured surface may be at least partially concealed by the lug 118 (as shown in FIG. 1). The outer port (and corresponding vent assembly) may thus be concealed or camouflaged from a user when the lug 118 is engaged within the engagement feature 116. The interior contoured surface of the engagement feature 116 may be configured to allow air to exit and/or enter the vent assembly. For example, as described above with respect to FIGS. 1 and 2, the lug 118 may be offset or separated from the engagement feature 116 when engaged therein. Additionally or alternatively to the described offset, FIGS. 5A-5B depict alternate embodiments of the interior contoured surface of the slot that may facilitate the flow of air through the vent assembly.

With reference to FIG. 5A, the engagement feature 116 of the electronic device 104 is shown having multiple outer ports defined within an interior contoured surface. The multiple outer ports may be configured to increase air flow into and out of the enclosure 106 by expanding the area along the engagement feature 116 through which air may traverse in order to reach (or be expelled from) the vent assembly. In particular, FIG. 5A depicts outer ports 126 positioned on opposing sides of the engagement feature 116; however, other configurations are possible. Each of the outer ports 126 may be associated with a vent assembly, such as vent assemblies 124. The vent assemblies 124 may thus be a common vent assembly coupled with the outer ports 126; however, in other cases, the each of the vent assemblies 126 may be separately coupled to individual vent assemblies having distinct structures and configurations, according to the embodiments described herein.

With reference to FIG. 5B, the engagement feature 116 of the electronic device 104 is shown having an outer port and a vertical channel 119a formed into the interior contoured surface. The vertical channel may be a groove, cut, notch, or the like that extends from the outer port along a circumferential direction of the engagement feature 116. The vertical channel may provide further clearance or space between the engagement feature 116 and the lug 118, which may facilitate the flow of air through the vent assembly. In particular, FIG. 5B depicts a vertical channel 119a formed into the interior contoured surface of the engagement feature 116. The vertical channel 119a may extend from the outer port 126 and define a recessed portion of the engagement feature 116 that is configured to direct or otherwise funnel air into and out of the outer port 126. The recessed portion defined by the vertical channel 119a may increase air flow into and out of the enclosure 106 by expanding the area along the engagement feature 116 through which air may traverse in order to reach (or be expelled from) the vent assembly 124 associated with the outer port 126.

With reference to FIG. 5C, the engagement feature 116 of the electronic device 104 is shown having an outer port and a horizontal or longitudinal channel formed into the interior contoured surface. The horizontal channel may be a groove, cut, notch, or the like that extends from the outer port along a longitudinal direction of the engagement feature 116. The horizontal channel may provide further clearance or space between the engagement feature 116 and the lug 118, which may facilitate the flow of air through the vent assembly. In particular, FIG. 5C depicts a horizontal channel 119b formed into the interior contoured surface of the engagement feature 116. The horizontal channel 119b may extend from the outer port 126 and define a recessed portion of the engagement feature 116 that is configured to direct or otherwise funnel air into and out of the outer port 126. The recessed portion defined by the horizontal channel 119b may increase air flow into and out of the enclosure 106 by expanding the area along the engagement feature 116 through which air may traverse in order to reach (or be expelled from) the vent assembly 124 associated with the outer port 126.

Figure 6A:
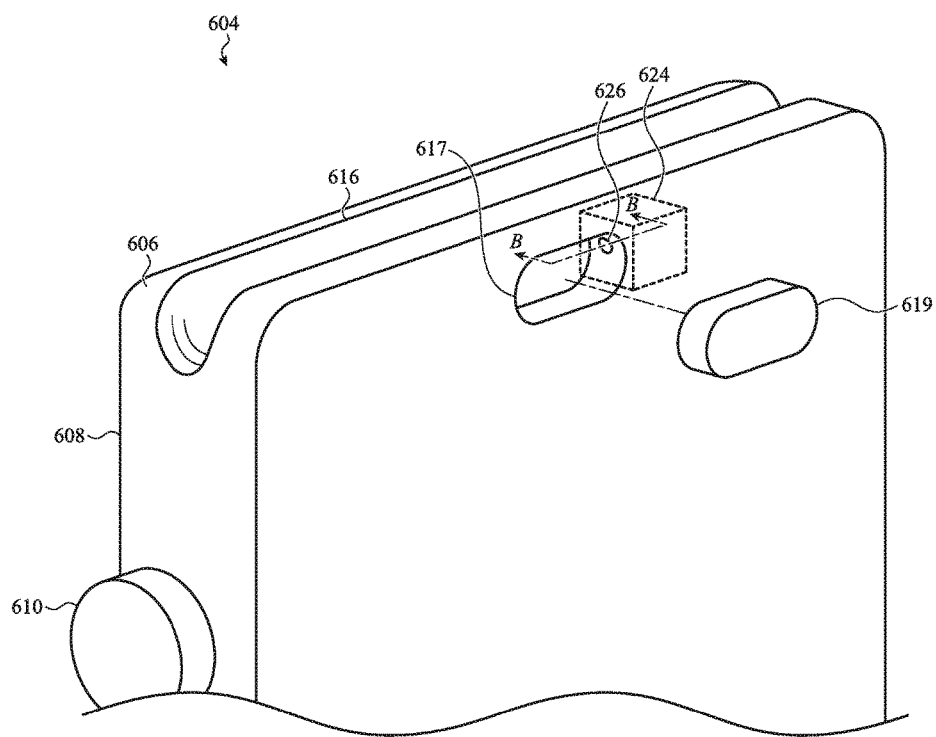
FIG. 6A depicts a sample electronic device having a vent assembly positioned along a band release opening.
Figure 6B:
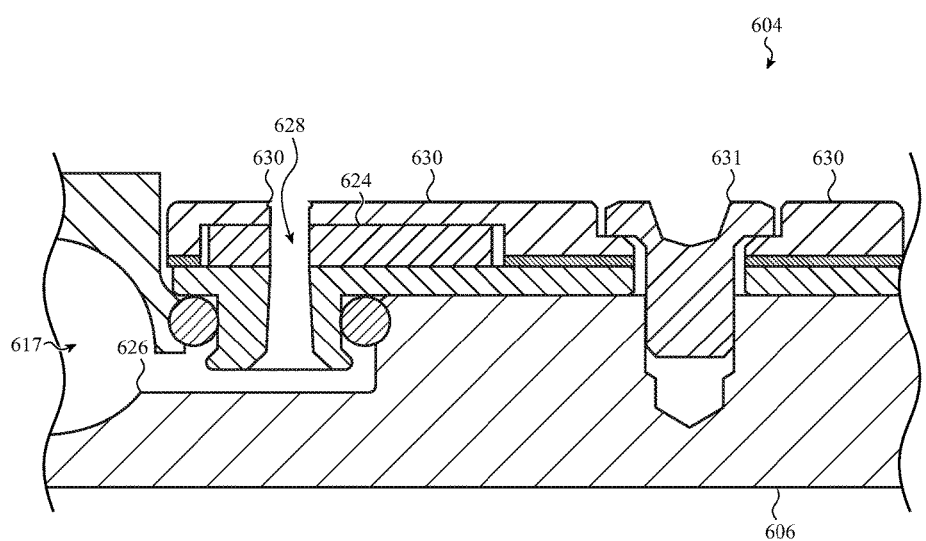
FIG. 6B depicts a cross-sectional view of the vent assembly of FIG. 6A, taken along line B-B of FIG. 6A.
Figure 6C:
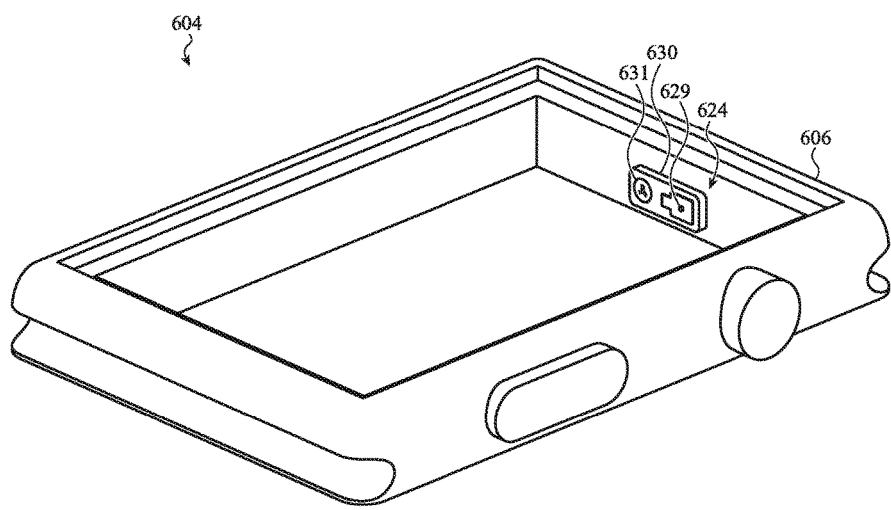
FIG. 6C depicts the vent assembly of FIG. 6A within an internal volume of the electronic device.

FIGS. 6A-6C depict a sample electronic device 604. For purposes of illustration, the electronic device 604 shown in FIG. 6A is a watch. In this regard, substantially analogous to the components described in relation to the embodiments of FIGS. 1-5C, the electronic device 604 may include an enclosure 606, a display 608, a crown 610, a slot 616, a retention feature 617, a release member 619, and an outer port 626.

The electronic device 604 may also include a vent assembly 624, such as the vent assemblies 124a-124c described above. The vent assembly 624 may allow for the controlled ingress and/or egress of air from a device enclosure while providing a physical barrier that prevents the migration of contaminants or debris into the enclosure. In this regard, the vent assembly 624 may be substantially analogous to the vent assemblies 124a-124c described above with respect to FIGS. 1-5C. The vent assembly 624 may be aligned with an outer port 626 defined along an exterior surface of the electronic device.

As described herein, vent assemblies of the present disclosure may be substantially concealed or camouflaged from a user. For example, the vent assembly may be associated with a through portion or opening defined in an exterior surface of the device enclosure. Various external components of the electronic device (band, lug, crown, button, fasteners, and so on) may visually obscure the external opening (port), based on a position and configuration of the vent assembly.

FIGS. 6A-6C depict embodiments in which the vent assembly 624 and associated outer port 626 may be substantially concealed or camouflaged from a user. In particular, FIGS. 6A-6C depict embodiments in which the outer port 626 is defined on a surface of the retention feature 617. As described above with respect to FIG. 2, the retention feature 617 may receive a release member 619 or other button that is used to disengage the lug 618 from the slot 616. Accordingly, retention feature 617 and the release member 619 may cooperate to visually obscure the outer port 626 (and associated vent assembly 624) from a user.

With reference to FIG. 6A, an exploded view of the electronic device 604 is shown in which the outer port 626 is defined on a surface of the retention feature 617. The retention feature 617 may be an elongated hole extending between a bottom surface of the enclosure 606 and the interior contoured surface of the slot 616. In the embodiment of FIG. 6A, the outer port 626 may be positioned at one of the elongated ends of the retention feature 617.

In the exploded view of FIG. 6A, the release member 619 is shown removed from the retention feature 617, thereby revealing the outer port 626. In an assembly configuration, the release member 619 may be at least partially positioned within the retention feature 617 and visually obscure the outer port 626, although entry of liquids and other contaminants may be constrained. This may allow the vent assembly 624 and associated functionality to be concealed from a user. Despite being visually obscured or partially covered by the release member 619, air may still flow substantially unobstructed into (and out of) the outer port 626. For example, the retention feature 617 and the release member 619 may be offset or separated slightly, thereby providing clearance between the retention feature 617 and the release member 619 for the passage of air.

With reference to FIG. 6B, a cross-sectional view of the vent assembly 624 of FIG. 6A is shown, taken along line B-B of FIG. 6A. As shown in FIG. 6B, the vent assembly 624 may be positioned within the enclosure 606 adjacent the outer port 626 defined in the longitudinal end of the retention feature 617. The vent assembly 624 may include a duct region 628 that defines a fluid path between the outer port 626 and an interior of the enclosure 606. As described above, the vent assembly 624 may be configured to equalize air pressure within the enclosure 606 via the outer port 626. The vent assembly 624 may also prevent contaminants, moisture, debris, and so on from reaching components and assemblies positioned within the enclosure 606.

The vent assembly 624 may be secured within the enclosure 606 by a bracket 630. The bracket 630 may include various holes configured to receive fasteners 631. The fasteners 631 may pass through the respective holes of the bracket 630 and fix or otherwise constrain the bracket 630 to the enclosure. The duct region 628 provides an air path between the outer port 626 and an internal volume of the enclosure 606.

With reference to FIG. 6C, the bracket 630 is shown coupled along an interior surface of the enclosure 606. As described above, the bracket 630 may be coupled to the interior surface using one or more fasteners 631; however, other attachment techniques and structures are possible. As shown in FIG. 6C, the bracket 630 may define an inner port 629. The inner port 629 may be fluidically coupled to the external environment using the vent assembly 624. Accordingly, the vent assembly 624 may be aligned with the inner port 629 and the outer port 624 in order to facilitate the flow of air between the internal volume of the enclosure 606 and the external environment.

Figure 7A:
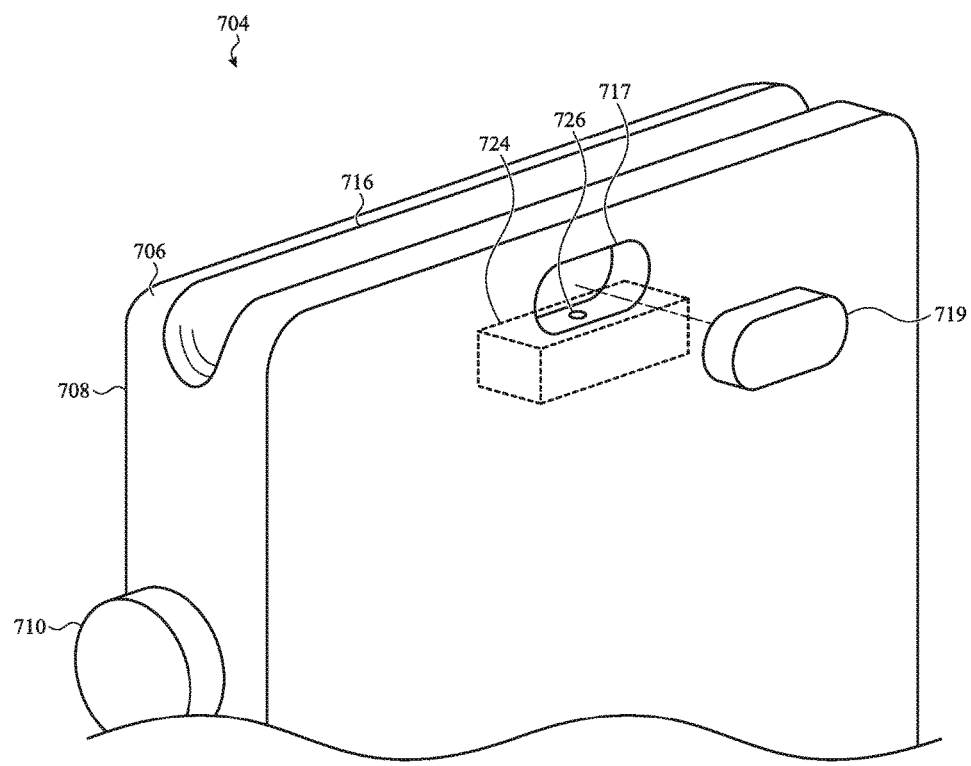
FIG. 7A depicts a sample electronic device having another embodiment of a vent assembly positioned along a band release opening.
Figure 7B:
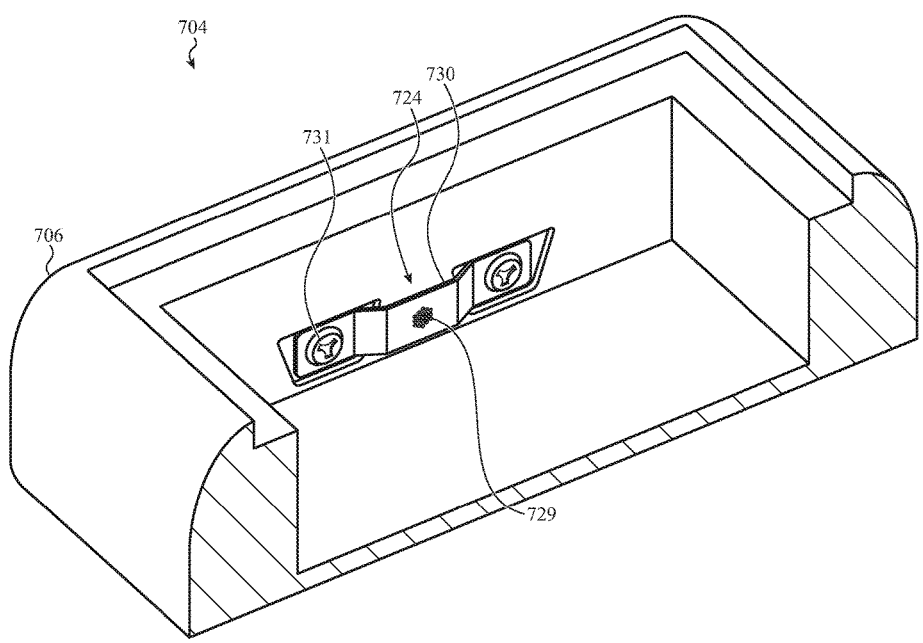
FIG. 7B depicts the vent assembly of FIG. 7A within an internal volume of the electronic device.

FIGS. 7A and 7B depict a sample electronic device 704. For purposes of illustration, the electronic device 704 shown in FIG. 7A is a watch. In this regard, substantially analogous to the components described in relation to the embodiments of FIGS. 1-5C, the electronic device 704 may include an enclosure 706, a display 708, a crown 710, a slot 716, a retention feature 717, a release member 719, and an outer port 726.

The electronic device 704 may also include a vent assembly 724, such as the vent assemblies 124a-124c, described above. The vent assembly 724 may allow for the controlled ingress and/or egress of air from a device enclosure while providing a physical barrier that prevents the mitigation of contaminants or debris into the enclosure. In this regard, the vent assembly 724 may be substantially analogous to the vent assemblies 124a-124c described above with respect to FIGS. 1-5C. The vent assembly 724 may be aligned with an outer port 726 defined along an exterior surface of the enclosure 706.

As described herein, vent assemblies of the present disclosure may be substantially concealed or camouflaged from a user. For example, the vent assembly may be associated with a through portion or opening defined in an exterior surface of the device enclosure. Various external components of the electronic device (band, lug, crown, button, fasteners, and so on) may visually obscure the external opening (port), based on a position and configuration of the vent assembly.

FIGS. 7A and 7B depict embodiments in which the vent assembly 724 and associated outer port 726 may be substantially concealed or camouflaged from a user. In particular, FIGS. 7A and 7B depict embodiments in which the outer port 726 is defined on a surface of the retention feature 717. As described above with respect to FIG. 2, the retention feature 717 may receive a release member 719 or other button that is used to disengage the lug 718 from the slot 716. Accordingly, retention feature 717 and the release member 719 may cooperate to visually obscure the outer port 726 (and associated vent assembly 724) from a user.

With reference to FIG. 7A, an exploded view of the electronic device 704 is shown in which the outer port 726 is defined on a surface of the retention feature 717. As described herein, the retention feature 717 may be an elongated hole extending between a bottom surface of the enclosure 706 and the interior contoured surface of the slot 716. In the embodiment of FIG. 7A, the outer port 726 may be positioned at one of the elongated sides of the retention feature 717.

In the exploded view of FIG. 7A, the release member 719 is shown removed from the retention feature 717, thereby revealing the outer port 726. In an assembled configuration, the release member 719 may be at least partially positioned within the retention feature 717 and visually obscure the outer port 726, although entry of liquids and other contaminants may be constrained. This may allow the vent assembly 724 and associated functionality to be concealed from a user. Despite being visually obscured or partially covered by the release member 719, air may still flow substantially unobstructed into (and out of) the outer port 726. For example, the retention feature 717 and the release member 719 may be offset or separated slightly, thereby providing clearance between the retention feature 717 and the release member 719 for the passage of air.

With reference to FIG. 7B, the vent assembly 724 is shown coupled an interior surface of the enclosure 706. In particular, a bracket 730 may couple the vent assembly 724 to the interior surface of the enclosure using one or more fasteners; however, other attachment techniques are possible. As shown in FIG. 7B, the bracket 730 may define an inner port 729. Accordingly, the vent assembly 724 may be aligned with the inner port 729 and the outer port 726 (FIG. 7A) in order to facilitate the flow of air between the internal volume of the enclosure 706 and the external environment.

Figure 8:
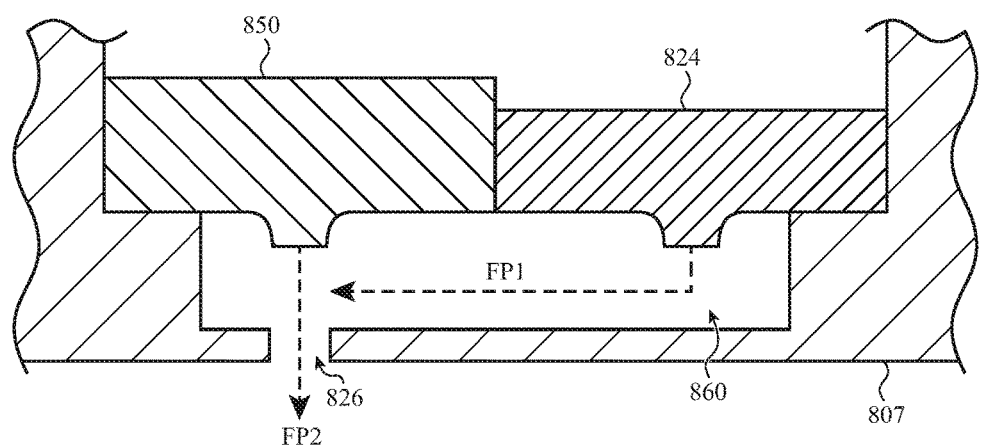
FIG. 8 depicts an outlet along the external surface shared by multiple components of the electronic device.

FIG. 8 depicts a cross-sectional view of an electronic device 804. The electronic device 804 may be substantially any electronic device, described herein, having an outer port or outlet along an exterior surface of an enclosure, such as the electronic devices 104, 604, 704, described above. Accordingly, the electronic device 804 may be a watch or other portable electronic device having an enclosure, display, crown, button, and/or other appropriate feature. As such, the discussion of the electronic device 804 is meant as illustrative only.

As described herein, vent assemblies of the present disclosure may be substantially concealed or camouflaged from a user. For example, the vent assembly may be associated with a through portion or opening defined in an exterior surface of the device enclosure. Various external components of the electronic device (band, lug, crown, button, fasteners, and so on) may visually obscure the external opening (port), based on a positioned and configuration of the vent assembly.

Camouflaging or concealing the vent assembly may also be accomplished by forming a shared internal volume with the electronic device so that multiple components or assemblies of the device are fluidically coupled to the external environment through a single port defined in the exterior of the device. For example, the device may include a microphone, a speaker, and/or other components that require flow of air from and/or toward the external environment, such as components that emit or receive acoustic energy. Both the component and the vent assembly may be fluidically coupled with the shared internal volume, thereby reducing externally visible holes of the watch.

For example, as shown in FIG. 8, the electronic device 804 may include outer port 826 defined along an exterior surface 807, such as an exterior surface of an enclosure or external housing. An internal volume 860, shown in FIG. 8, may be aligned with the outer port 826 and positioned within an interior of the electronic device 804. The internal volume 860 may be an internally enclosed portion of the electronic device 804 that is configured to couple multiple components, assemblies, vents, or the like to the outer port 826. Fluid paths from each of such components may thus extend through the internal volume 860 and the outer port 826, such that ingress and egress of air between the components and the external environment is at least partially shared using the internal volume 860. For purposes of illustration, the internal volume 860 is shown as rectangular, however, a variety of other shapes and configurations are possible. For example, the internal volume 860 may be an elongated cylindrical, cone, and/or substantially any other shape that defines a volume extending from the outer port 826.

In the embodiment of FIG. 8, the electronic device may include a vent assembly 824 and an acoustic component 850. The vent assembly 824 may be substantially analogous to the vent assemblies 124a-124c described above with respect to FIGS. 3A-3C. For example, the vent assembly 824 may be configured to facilitate equalization of pressure within a device enclosure. The vent assembly 824 may thus provide a fluid path for the ingress and egress of air between an internal volume of the enclosure and an external environment. The vent assembly 824 may also form a physical barrier that prevents or impedes the ingress of contaminants, such as various liquids (including water), oils, dust, debris, and so on into the enclosure. The acoustic component 850 may be a microphone, a speaker, and/or other components that require flow of air from and/or toward the external environment and/or other components where it may be desirable to vent to the external environment.

The vent assembly 824 and the acoustic component 850 are shown in FIG. 8 coupled to the internal volume 860. The coupling of the vent assembly 824 and the acoustic component 850 with the internal volume 860 may allow for the substantially unobstructed flow of air therebetween. In this regard, a fluid path may be defined from each of the vent assembly 824 and the internal component 856 through the internal volume 860 and toward the external environment using the outer port 826. The vent assembly 824 and the acoustic component 850 may thus be fluidically coupled with the external environment. For example, a fluid path FP1 may be defined from the vent assembly 824 through the internal volume 860 and to the external environment through the outer port 826. Further, a fluid path FP2 may be defined from the acoustic component 850 through the internal volume 860 and to the external environment through the outer port 826. As shown in FIG. 8, the fluid path FP1 and the fluid path FP2 may combine or merge within the internal volume 860 and/or otherwise travel along a common direction. This may allow the vent assembly 824 and the acoustic component 850 to reach the external environment through a common opening in the exterior surface, such as the outer port 826.

It will be appreciated that the vent assembly 824 and the internal component 856 are shown in FIG. 8 for purposes of illustration. In other cases, additional components or assemblies may be coupled with the internal volume 860, including additional vent assemblies, or various combinations of speakers, microphones, and/or other components that transmit or receive acoustic energy. In this regard, in some embodiments, a waterproofing or contaminant barrier may be positioned at the outer port 826 to shield the internal component from debris; however, this is not required.

Figure 9:
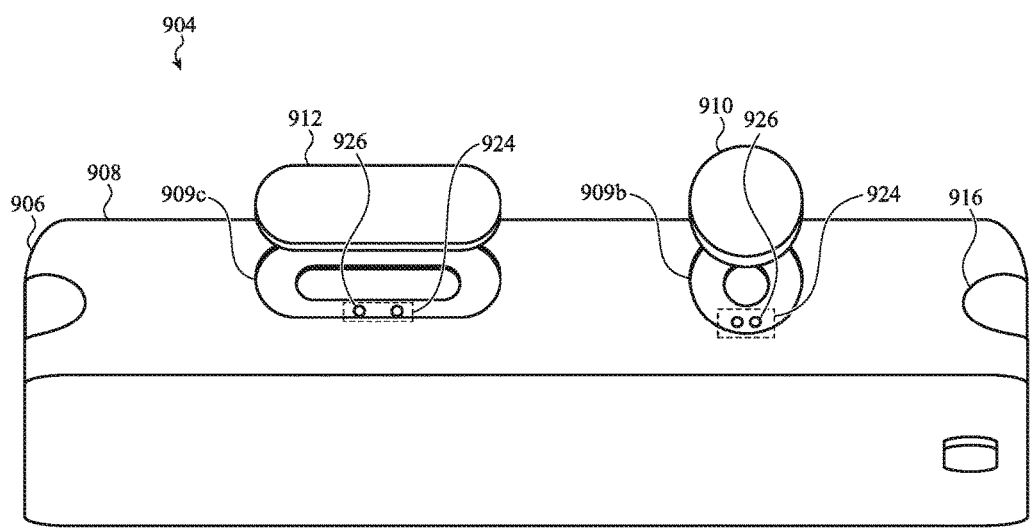
FIG. 9 depicts a sample electronic device having a concealed vent assembly positioned along input structures.

FIG. 9 depicts a sample electronic device 904. For purposes of illustration, the electronic device 904 shown in FIG. 9 is a watch. In this regard, substantially analogous to the components described in relation to the embodiments of FIGS. 1-5C, the electronic device 904 may include an enclosure 906, a display 908, a dial 910, a button cap 912, a slot 916, and an outer port 926. The dial 910 and the button cap 912 may be input members of the electronic device 904. For example, the dial 910 may form an exterior input member for a crown and the button cap 912 may form an exterior input member of a button.

The electronic device 904 may also include a vent assembly 924, such as the vent assemblies 124a-124c, described above. The vent assembly 924 may allow for the controlled ingress and/or egress of air from a device enclosure while providing a physical barrier that prevents the migration of contaminants or debris into the enclosure. In this regard, the vent assembly 924 may be substantially analogous to the vent assemblies 124a-124c described above with respect to FIGS. 1-5C. As described herein, the vent assembly 924 may be aligned with an outer port or opening defined along an exterior surface of the enclosure 906.

Vent assemblies of the present disclosure may be substantially concealed or camouflaged from a user. For example, the vent assembly may be associated with a through portion or opening defined in an exterior surface of the device enclosure. Various external components of the electronic device (band, lug, crown, button, fasteners, and so on) may visually obscure the external opening (port), based on a position and configuration of the vent assembly.

In the embodiment of FIG. 9, the vent assembly 924 and associated outer port 926 may be visually obscured by one or more input structures of the electronic device 904, such as the dial 910 and/or the button cap 912. As described above, the dial 910 may be at least partially received by a second opening 909b and the button cap 912 may be at least partially received by a third opening 909c defined along a side of the enclosure 906. The electronic device 904 may include multiple outer ports that are position along a surface that defines one or both of the second and/or third openings 909b, 909c. Accordingly, in the assembled configuration, the dial 910 and/or the button cap 912 may be at least partially overlapping the outer port 926, or multiple outer ports, as may be appropriate for a given application. This may visually obscure the outer port 926, thereby concealing the vent assembly 924 and associated functionality from a user.

Despite being visually obscured or partially covered by the dial 910 and/or button cap 912, air may still flow substantially unobstructed into (and out of) the outer port 926. For example, the dial 910 and/or the button cap 912 may be offset or separated slightly from the respective ones of the second opening 909b and the third opening 909c. This separation may provide clearance along an external surface of the enclosure 906 for the passage of air.

As shown in FIG. 9, multiple outer ports 926 may be positioned along a surface that defines the second opening 909b or the third opening 909c. The multiple openings along the surface may increase the throughput of air into (and out of) the associated vent assembly 924. As such, each of the outer ports 926 along a respective one of the second opening 909b or the third opening 909c may be fluidically coupled with a common or shared vent assembly 924.

It will be appreciated that while the electronic device 904 is shown in FIG. 9 as having outer ports positioned along surfaces of each of the second opening 909b and the third opening 909c, other configurations are possible. For example, in one embodiment, the outer port 926 may be positioned along a surface that defines the second opening 909b and the surface that defines the third opening 909c may be substantially free of any outer port fluidically coupled to a vent assembly. In another embodiment, the outer port 926 may be positioned along a surface that defines the third opening 909c and the surface that defines the second opening 909b may be substantially free of any outer port fluidically coupled to a vent assembly, among other possibilities.

Figure 10A:
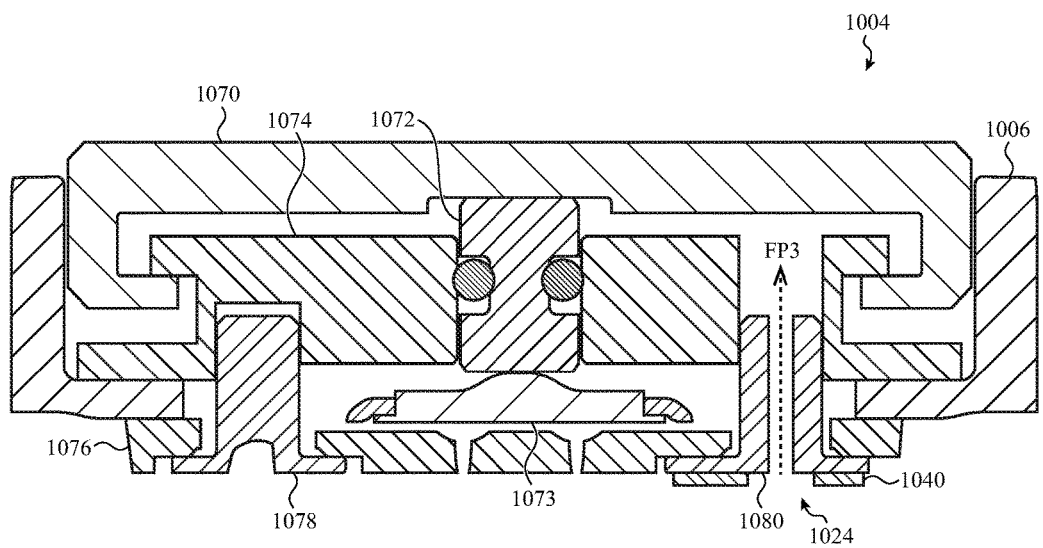
FIG. 10A depicts a cross-sectional view of a button of a sample electronic device having an internal fastener with a through hole.
Figure 10B:
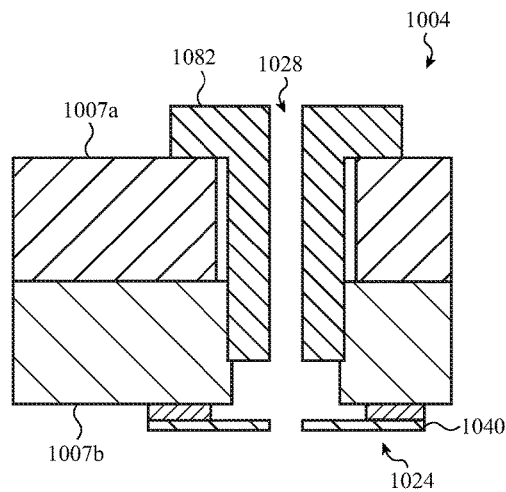
FIG. 10B depicts a cross-sectional view of a sample electronic device having an external fastener with a through hole.

FIGS. 10A and 10B depict cross-sectional views of an electronic device 1004. The electronic device 1004 may be substantially any electronic device, described herein, having an outer port or outlet along an exterior surface of an enclosure, such as the electronic device 104, 604, 704, 804, or 904, described above. Accordingly, the electronic device 1004 is meant as illustrative only.

As described herein, vent assemblies of the present disclosure may be substantially concealed or camouflaged from a user. For example, the vent assembly may be associated with a through portion or opening defined in an exterior surface of the device enclosure. Various external components of the electronic device (band, lug, crown, button, fasteners, and so on) may visually obscure the external opening (port), based on the position and configuration of the vent assembly.

Camouflaging or concealing the vent assembly may also be accomplished by using a fastener having a through hole or hollow portion. For example, a hollow fastener, such as a screw, pin, plug, bolt, or the like may have an internally through portion that allows for the substantially unobstructed flow of air through a body of the fastener. The hollow fastener may thus be configured to extend through an internal or external housing or enclosure of the electronic device 1004 and allow for the passage of air therethrough. A vent assembly or other contaminant barrier may be positioned along the hollow fastener within an interior of the electronic device 1004. Along an exterior of the electronic device 1004, the vent assembly and associated functionality may be substantially concealed from a user. Despite being visually obscured or partially covered by the hollow fastener, air may still flow substantially unobstructed into (and out of) the vent assembly via the through hole defined within the body of the hollow fastener.

The hollow fasteners shown in FIGS. 10A-10B may be used to visually obscure or conceal a vent assembly 1024, such as the vent assemblies 124a-124c described above. The vent assembly 1024 may allow for the controlled ingress and/or egress of air from a device enclosure while providing a physical barrier that prevents the migration of contaminants or debris into the enclosure. In this regard, the vent assembly 1024 may be substantially analogous to the vent assemblies 124a-124c described above with respect to FIGS. 1-5C and include at least a membrane 1040. It will be appreciated, however, that the embodiments of FIGS. 10A and 10B are shown for purposes of illustration only. In other cases, the vent assembly 1024 may include a variety of other layers, membranes, and/or adhesives, as describe herein, or various perforated layers positioned along either side of the membrane 1040.

With reference to FIG. 10A, the electronic device 1004 may include a button 1070 at least partially positioned within an opening defined along an enclosure 1006. The button may be configured to receive at least translatable input that is used to control a function of the electronic device 1004. Various internal components may be positioned below an input surface defined by the button 1070 to facilitate the foregoing, including components used to produce a tactile effect and secure the button 1070 within the opening. Sample components shown in FIG. 10A include a shaft 1072, tactile dome 1073, bracket 1074, and substrate; however, more or fewer components may be used in various applications. Depression of the button 1070 may translate the shaft 1072 inward, causing the tactile dome 1073 to collapse. This may trigger a switch event at the substrate 1076 using various electrical traces not shown in FIG. 10A in the interest of clarity.

In a sample embodiment, the button 1007 (and associated bracket 1074) may be coupled to the substrate 1076 or other appropriate internal structure using internal fasteners. At least one of the internal fasteners may be a hollow fastener having a through portion as described herein that may be used to fluidically couple an internal vent assembly to an external environment. For example, a hollow fastener 1080 may be used to define a fluid path FP3 between an internal volume of the electronic device 1004 and an underside of the button 1070 (which may be open to an external environment). The vent assembly 1024 described herein may be aligned along the hollow fastener 1080. Accordingly, entry of liquids or other contaminants may be constrained from entering the internal volume of the enclosure 1006, while still allowing air to pass through substantially unobstructed. The electronic device 1004 may also include one or more monolithic fasteners 1078 (e.g., a substantially solid fastener lacking a hollow portion) that may also couple various internal components of the electronic device 1004 to one another.

It will be appreciated that the button 1070 shown in FIG. 10A is one example of many possible configurations of the electronic device 1004 and hollow fastener 1080. Broadly, the hollow fastener 1080 may be used to couple any internal components of the electronic device 1004 and define a fluid path therethrough. The vent assembly 1024 may generally be positioned along the hollow fastener 1080 in any such configuration. This may allow the hollow fastener 1080 to visually obscure the vent assembly 1024 at a variety of positions within the electronic device 1004. In some cases, multiple hollow fasteners may be used or coupled with the vent assembly 1024, which may help adequately maintain the flow of air between an internal volume of the electronic device 1004 and an external environment.

With reference to FIG. 10B, the electronic device 1004 may also include one or more external fasteners that are used to conceal the vent assembly 1024. For example, the electronic device 1004 may include a hollow fastener 1082 that extends from an exterior surface 1007a of the electronic device 1004 toward an interior surface 1007b of the electronic device 1004. In some cases, the exterior surface 1007a and the interior surface 1007b may be defined by distinct components or layers of the electronic device 1004 that are coupled to one another using the hollow fastener 1082; however, this is not required. In other cases, the exterior surface 1007a and the interior surface 1007b may be opposing surfaces of the same component, such as a device enclosure.

The hollow fastener 1082 may be substantially analogous to the hollow fastener 1080 described above with respect to FIG. 10A. In this regard, the hollow fastener may define a fluid path FP3 that extends substantially between the exterior surface 1007a and the interior surface 1007b. The vent assembly 1024 described herein may be aligned along the hollow fastener 1080. Accordingly, entry of liquids or other contaminants may be constrained from entering an internal volume of the enclosure 1006, while still allowing air to pass through substantially unobstructed, as described herein. In some cases, multiple hollow fasteners may be used or coupled with the vent assembly 1024, which may help adequately maintain the flow of air between an internal portion of the enclosure and an external environment of the electronic device 1004.

Figure 11:
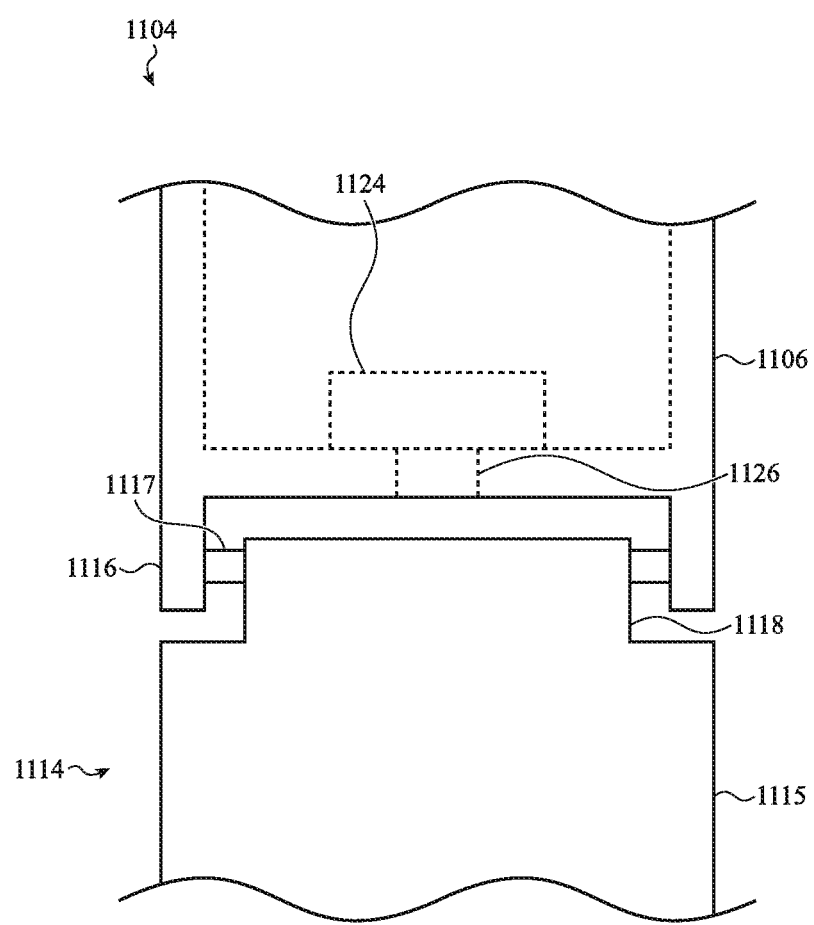
FIG. 11 depicts a cross-sectional view of a sample electronic device having a conceal vent assembly positioned along an engagement feature.

FIG. 11 depicts a cross-sectional view of an electronic device 1104. The electronic device 1104 may be substantially any electronic device, described herein, having an outer port or outlet along an exterior surface of an enclosure, such as the electronic device 104, 604, 704, 804, 904, or 1004, described above. Accordingly, the electronic device 1104 is meant as illustrative only.

As described herein, vent assemblies of the present disclosure may be substantially concealed or camouflaged from a user. For example, the vent assembly may be associated with a through portion or opening defined in an exterior surface of the device enclosure. Various external components of the electronic device (band, lug, crown, button, fasteners, and so on) may visually obscure the external opening (port), based on the position and configuration of the vent assembly.

Camouflaging or concealing the venting assembly may also be accomplished using a watch band attached with an enclosure of the electronic device 1104, according to the embodiment of FIG. 11. For example, FIG. 11 shows a watch band 1114 pivotally coupled to an enclosure 1106. When coupled to one another, or otherwise engaged, the watch band 1114 may be used to visually obscure or conceal a vent assembly 1124, such as the vent assemblies 124a-124c described above. The vent assembly 1124 may allow for the controlled ingress and/or egress of air from a device enclosure (e.g., through an outer port 1126) while providing a physical barrier that prevents the migration of contaminants or debris into the enclosure. In this regard, the vent assembly 1124 may be substantially analogous to the vent assemblies 124a-124c described above with respect to FIGS. 1-5C and include a membrane, screen, or other feature that facilitates forming the physical barrier across the outer port 1126. It will be appreciated, however, that the embodiment of FIG. 11 is shown for purposes of illustration only. In other cases, the vent assembly 1124 may include a variety of other layers, membranes, and/or adhesives, as describe herein.

In the embodiment of FIG. 11, the electronic device 1104 may include a engagement feature 1116. The engagement feature 1116 may be a watch lug or other projection or structure coupled with or defined by the enclosure 1106. The engagement feature 1116 may be used to couple, including pivotally couple, the watch band 1114 to the enclosure 1106. For example, the engagement feature 1116 may include one or more holes, recesses, or through portions that may receive a pin or other structure. As shown in FIG. 11, the engagement feature 1117 may receive a pin 1117. The watch band 1114 may be pivotally coupled or otherwise attached to the enclosure using the pin 1117, as described herein. When the watch band 1114 is attached to the pin 1117, the watch band 1114 may conceal or visually obscure the vent assembly 1124 and associated outer port 1126.

In some cases, as shown in FIG. 11, the watch band 1114 may include a flexible strap 1115 and a mating region 1118. The mating region 1118 may be connected to the flexible strap 1115 and, in some cases, be constructed form a different material (including a material of different rigidity) than the flexible strap 1115 and facilitate connection of the flexible strap 1115 to the enclosure 1106. For example, the mating region 1118 may include a holes, recesses, or through portions that may receive the pin 1117. The watch band 1114 may rotate or pivot about the pin 1117, thereby allowing the watch band 1114 to rotate or pivot relative to the enclosure 1106. The mating region 1118 may also be received generally by the engagement feature 1116. This may allow a side surface of the enclosure 1106 and a edge of the flexible strap 1115 to form a substantially continuous or aligned contour that may enhance aesthetics and functionality of the electronic device 1104.

It will be appreciated, however, that while FIG. 11 generally shows the watch band 1114 configured to pivot relative to the enclosure 1106, this is not required. In some cases, the watch band 1114 may be connected to, formed with, or other coupled with the enclosure 1106, which may facilitate a more permanent connection between the enclosure 1106 and the watch band 1114. Notwithstanding, the watch band 1114 may be configured to flex relative to the enclosure 1106 and encircle, for example, a user's wrist or other body portion. The watch band 1114 may also be separated from the outer port 1126 in order to allow air through the vent assembly 1124. This may be accomplished while concealing or camouflaging the outer port 126 and the functions of the vent assembly 1125.

Figure 12:
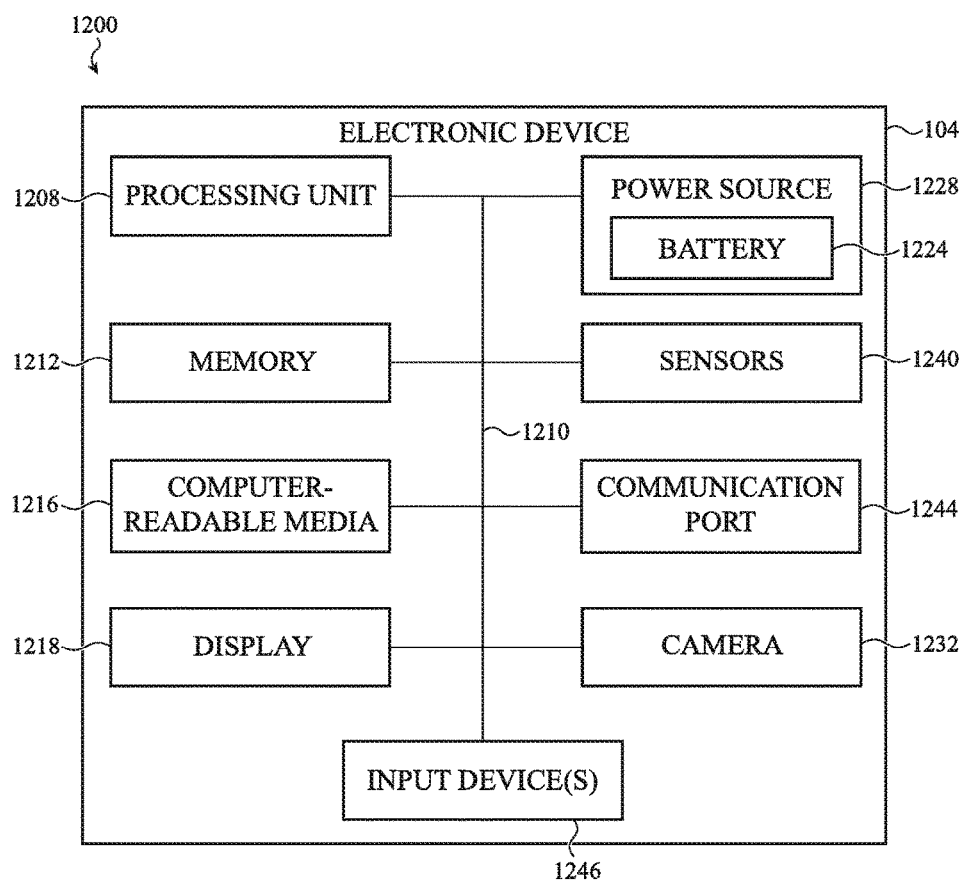
FIG. 12 depicts a functional block diagram of a sample electronic device.

FIG. 12 presents a functional block diagram 1200 of a sample electronic device, such as the electronic device 104 described with respect to FIGS. 1-5C. It will be appreciated, however, that the functional block diagram described herein of electronic device 104 may include components substantially analogous to components of other electronic devices or the like described herein. In this regard, the schematic representation in FIG. 12 may correspond to the electronic device depicted in FIGS. 1-5C, described above. However, the schematic representation in FIG. 12 may also correspond to the other electronic devices or the like described herein, for example, such as electronic devices 604, 704, 804, 904, 1004, and 1104 described with respect to FIGS. 6A-11. The electronic device 104 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 12, the electronic device 104 may include a processing unit 1208 operatively connected to computer memory 1212 and computer-readable media 1216. The processing unit 1208 may be operatively connected to the computer memory 1212 and computer-readable media 1216 components via an electronic bus or bridge (e.g., such as system bus 1210). The processing unit 1208 may include one or more computer processors or microcontrollers that are configured to perform operations in response to computer-readable instructions. The processing unit 1208 may be a central processing unit of the electronic device 104. Additionally or alternatively, the processing unit 1208 may be other processors within the device including application specific integrated chips (ASIC) and other microcontroller devices.

The computer memory 1212 may include a variety of types of non-transitory computer-readable storage media, including, for example, read access memory (RAM), read-only memory (ROM), erasable programmable memory (e.g., EPROM and EEPROM), or flash memory. The memory 1212 is configured to store computer-readable instructions, sensor values, and other persistent software elements. Computer-readable media 1216 may also include a variety of types of non-transitory computer-readable storage media including, for example, a hard-drive storage device, a solid state storage device, a portable magnetic storage device, or other similar device. The computer-readable media 1216 may also be configured to store computer-readable instructions, sensor values, and other persistent software elements.

In this example, the processing unit 1208 is operable to read computer-readable instructions stored on the computer memory 1212 and/or computer-readable media 1216. The computer-readable instructions may adapt the processing unit 1208 to perform the operations or functions described above with respect to FIGS. 1-11. The computer-readable instructions may be provided as a computer-program product, software application, or the like. It should be appreciated that, where the electronic device 104 is a stylus, the processing unit 1208 may be located in an electronic device associated with the stylus, rather than the stylus itself. In such embodiments, data may be transmitted from the stylus to and from the electronic device, such that the processing unit in the electronic device may operatively control the stylus.

As shown in FIG. 12, the electronic device 104 may also include a display 1218. The display 1218 may include a liquid-crystal display (LCD), organic light emitting diode (OLED) display, light emitting diode (LED) display, or the like. If the display 1218 is an LCD, the display may also include a backlight component that can be controlled to provide variable levels of display brightness. If the display 1218 is an OLED or LED type display, the brightness of the display 1218 may be controlled by modifying the electrical signals that are provided to display elements.

The electronic device 104 may also include a battery 1224 that is configured to provide electrical power to the components of the electronic device 104. The battery 1224 may include one or more power storage cells that are linked together to provide an internal supply of electrical power. In this regard, the battery 1224 may be a component of a power source 1228 (e.g., including a charging system or other circuitry that supplies electrical power to components of the electronic device 104). The battery 1224 may be operatively coupled to power management circuitry that is configured to provide appropriate voltage and power levels for individual components or groups of components within the electronic device 104. The battery 1224, via power management circuitry, may be configured to receive power from an external source, such as an AC power outlet or interconnected computing device. The battery 1224 may store received power so that the electronic device 104 may operate without connection to an external power source for an extended period of time, which may range from several hours to several days.

The electronic device 104 may also include one or more sensors 1240 that may be used to detect a touch and/or force input, environmental condition, orientation, position, or some other aspect of the electronic device 104. Example sensors 1240 that may be included in the electronic device 104 may include, without limitation, one or more accelerometers, gyrometers, inclinometers, goniometers, or magnetometers. The sensors 1240 may also include one or more proximity sensors, such as a magnetic hall-effect sensor, inductive sensor, capacitive sensor, continuity sensor, or the like. In some implementations, one or more of the sensors 1240 may include or be configured to operate in conjunction with an electrode of a metal layer of a circuit assembly, as described herein. For example, an electrode of the metal layer may for a sensing element for a touch and/or force sensor that is configured to detect an input along a surface of the device 104.

The sensors 1240 may also be broadly defined to include wireless positioning devices including, without limitation, global positioning system (GPS) circuitry, Wi-Fi circuitry, cellular communication circuitry, and the like. The electronic device 104 may also include one or more optical sensors including, without limitation, photodetectors, photosensors, image sensors, infrared sensors, or the like. In one example, the sensor 1240 may be an image sensor that detects a degree to which an ambient image matches a stored image. As such, the sensor 1240 may be used to identify a user of the electronic device 104. The sensors 1240 may also include one or more acoustic elements, such as a microphone used alone or in combination with a speaker element. The sensors 1240 may also include a temperature sensor, barometer, pressure sensor, altimeter, moisture sensor or other similar environmental sensor. The sensors 1240 may also include a light sensor that detects an ambient light condition of the electronic device 104.

The sensor 1240, either alone or in combination, may generally be a motion sensor that is configured to determine an orientation, position, and/or movement of the electronic device 104. For example, the sensor 1240 may include one or more motion sensors including, for example, one or more accelerometers, gyrometers, magnetometers, optical sensors, or the like to detect motion. The sensors 1240 may also be configured to determine one or more environmental conditions, such as temperature, air pressure, humidity, and so on. The sensors 1240, either alone or in combination with other input, may be configured to estimate a property of a supporting surface including, without limitation, a material property, surface property, friction property, or the like.

The electronic device 104 may also include a camera 1232 that is configured to capture a digital image or other optical data. The camera 1232 may include a charge-coupled device, complementary metal oxide (CMOS) device, or other device configured to convert light into electrical signals. The camera 1232 may also include one or more light sources, such as a strobe, flash, or other light-emitting device. As discussed above, the camera 1232 may be generally categorized as a sensor for detecting optical conditions and/or objects in the proximity of the electronic device 104. However, the camera 1232 may also be used to create photorealistic images that may be stored in an electronic format, such as JPG, GIF, TIFF, PNG, raw image file, or other similar file types.

The electronic device 104 may also include a communication port 1244 that is configured to transmit and/or receive signals or electrical communication from an external or separate device. The communication port 1244 may be configured to couple to an external device via a cable, adaptor, or other type of electrical connector. In some embodiments, the communication port 1244 may be used to couple the electronic device 104 with a computing device and/or other appropriate accessories configured to send and/or receive electrical signals. The communication port 1244 may be configured to receive identifying information from an external accessory, which may be used to determine a mounting or support configuration. For example, the communication port 1244 may be used to determine that the electronic device 104 is coupled to a mounting accessory, such as a particular type of stand or support structure.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   an enclosure defining an interior volume, an engagement feature, and a port extending from an inner surface of the interior volume to a surface of the engagement feature;
   a display at least partially positioned within the enclosure;
   a watch band that is coupled to the engagement feature of the enclosure;
   a bracket positioned within the interior volume of the enclosure; and
   a vent assembly positioned between the bracket and the inner surface of the interior volume and comprising:
   an air-permeable membrane defining a moisture barrier; and a screen positioned along the air-permeable membrane,
wherein the watch band visually obscures the port when
the watch band is coupled to the engagement feature.

2. The electronic device of claim 1, wherein the engagement feature is a receiving slot that extends along a side of the enclosure.

3. The electronic device of claim 2, wherein the port is positioned offset from a middle of the electronic device.

4. The electronic device of claim 3, wherein:
the watch band includes a strap and a lug coupled to the strap; and
the lug and the engagement feature cooperate to releasably couple the watch band and the enclosure.

5. The electronic device of claim 1 wherein:
the display includes a touch sensor and is configured to receive a touch input;
the electronic device further comprises a crown at least partially extending through an opening in the enclosure;
the crown is configured to receive a translational input and a rotational input; and
the display is configured to depict a graphical output of the electronic device that is responsive to each of:
the touch input of the touch sensor of the display;
the translational input of the crown; and
the rotational input of the crown.

6. The electronic device of claim 1, wherein
the vent assembly is configured to equalize an internal pressure of the interior volume with an external pressure of an external environment.

7. The electronic device of claim 1, wherein the enclosure is impermeable to liquid and the vent assembly is substantially impermeable to liquid.

8. The electronic device of claim 1, wherein:
the watch band comprises a lug; and
the lug is positioned at least partially in the engagement feature.

9. An electronic device, comprising:
an enclosure defining:
an interior volume;
a sidewall defining a slot configured to receive a watch band;
an outer port extending from an inner surface of the interior volume to a surface of the slot;
a bracket positioned within the enclosure and defining an inner port; and
a vent assembly secured between the bracket and the enclosure, the vent assembly having a duct region that forms at least part of a passage between the outer port and the inner port, the vent assembly comprising, within the duct region:
an air-permeable membrane defining a moisture barrier; and
a screen stacked along the air-permeable membrane.

10. The electronic device of claim 9, wherein:
the vent assembly further comprises a deformable layer forming at least a portion of a sidewall of the duct region; and
the bracket is configured to compress the deformable layer.

11. The electronic device of claim 10, wherein:
the bracket is coupled to the enclosure by a fastener; and
a cantilevered portion of the bracket extends from the fastener and defines the inner port.

12. The electronic device of claim 9, wherein:
the screen is a first screen adjacent the outer port; and
the vent assembly further comprises, within the duct region:
a second screen stacked along the air-permeable membrane opposite the first screen.

13. The electronic device of claim 12, wherein the vent assembly is configured to reduce a pressure differential between an interior volume of the enclosure and an external environment.

14. The electronic device of claim 13, wherein at least one of the first screen or the second screen is configured to limit deflection of the air-permeable membrane within the duct region caused by the pressure differential.

15. The electronic device of claim 9, wherein the vent assembly further comprises:
a film configured to form a temporary seal between an interior volume of the enclosure and both of the air-permeable membrane and the screen and having a punctured section that extends into the duct region.

16. An electronic device, comprising:
an enclosure defining a slot along an exterior side of the enclosure and having a port formed in a surface of the slot;
a vent assembly positioned within the enclosure and defining a duct region configured to channel air between the port and an interior volume of the enclosure, the vent assembly comprising:
an air-permeable membrane extending across the duct region and defining a moisture barrier; and
a screen between the air-permeable membrane and the port; and
a watch band positioned at least partially within the slot and at least partially overlapping the port.

17. The electronic device of claim 16, further comprising a dial configured to receive rotatable and translatable input.

18. The electronic device of claim 16, wherein the vent assembly further comprises an overmolded layer defining sidewalls of the duct region and molded over at least a portion of the screen.

19. The electronic device of claim 18, wherein the screen comprises a mesh layer having a group of intertwined structures.

20. The electronic device of claim 18, wherein:
the electronic device further comprises:
a display at least partially positioned within the enclosure;
a cover covering the display; and
a touch sensor configured to sense a touch input applied to the cover; and
the display is configured to depict a graphical output that is responsive to the touch input.

* * * * *